US005958271A

United States Patent [19]

Westerberg et al.

[11] Patent Number: 5,958,271

[45] Date of Patent: Sep. 28, 1999

[54] LIGHTWAVE OVEN AND METHOD OF COOKING THEREWITH WITH COOKWARE REFLECTIVITY COMPENSATION

[75] Inventors: Eugene R. Westerberg, Palo Alto; Donald W. Pettibone, Cupertino, both of Calif.

[73] Assignee: Quadlux, Inc., Fremont, Calif.

[21] Appl. No.: 09/060,518

[22] Filed: Apr. 14, 1998

Related U.S. Application Data

[60] Provisional application No. 60/059,754, Sep. 23, 1997.

[51] Int. Cl.[6] ...... A21B 2/00

[52] U.S. Cl. ...... 219/413; 219/411; 99/331

[58] Field of Search ...... 219/395, 398, 219/406, 408, 413, 405, 411; 426/243, 241, 248, 523; 99/325, 326, 329 R, 331; 392/416, 418

[56] References Cited

U.S. PATENT DOCUMENTS

| | | | |
|---|---|---|---|
| D. 245,162 | 7/1977 | Zimmer | D15/108 |
| 500,371 | 6/1893 | Brachhausen et al. . | |
| 793,424 | 6/1905 | Custer . | |

(List continued on next page.)

FOREIGN PATENT DOCUMENTS

| | | |
|---|---|---|
| 0 023 724 | 2/1981 | European Pat. Off. . |
| 0 215 617 | 9/1986 | European Pat. Off. . |
| 0 332 081 | 9/1989 | European Pat. Off. . |
| 0 455 169 A2 | 6/1991 | European Pat. Off. . |
| 25 46 106 | 4/1977 | Germany . |
| 35 03 648 | 4/1986 | Germany . |
| 34 42 804 A1 | 6/1986 | Germany . |
| 52-112146 | 9/1977 | Japan . |
| 57-60007 | 4/1982 | Japan . |
| 57-70323 | 4/1982 | Japan . |
| 59-1930 | 1/1984 | Japan . |
| 59-47302 | 3/1984 | Japan . |
| 59-210228 | 11/1984 | Japan . |
| 60-37116 | 2/1985 | Japan . |
| 60-69920 | 5/1985 | Japan . |
| 60-167932 | 11/1985 | Japan . |
| 60-245933 | 12/1985 | Japan . |
| 63-34913 | 3/1988 | Japan . |
| 63-46720 | 3/1988 | Japan . |
| 63-49405 | 4/1988 | Japan . |

(List continued on next page.)

OTHER PUBLICATIONS

Fostoria Corp., "Heat Processing with Infrared," Feb. 1962, pp. 1–7.

Summer, W. Dr., "Ultra–Violet and Infra–Red Engineering," 1962, pp. 102–112.

Beggs, E.W., "Quicker Drying With Lamps,"Jul. 1939, vol. 97, No. 7, pp. 88–89.

Harold McGee, Book, "On Food and Cooking," Charles Schribner's Sons, New York, 1984, chapter 14, pp. 608–624.

Hidemi Sato et al., "Effects Of Radiative Characteristics Of Heaters On Crust Formation And Coloring Processes Of Food Surface," Nippon Shokuhin Kagaku Kogaku Kaishi, vol. 42, No. 9, pp. 643–648, (1995).

*Primary Examiner*—Joseph Pelham
*Attorney, Agent, or Firm*—Limbach & Limbach L.L.P.

[57] ABSTRACT

A lightwave oven and method of cooking therewith that cooks food contained in cookware having a given reflectivity, and automatically changes the lightwave oven cooking sequence to compensate for the reflectivity of the cookware. The lightwave oven includes an oven cavity housing that encloses a cooking region therein. A first plurality and a second plurality of high power lamps provide radiant energy in the visible, near-visible and infrared ranges of the electromagnetic spectrum. The first plurality of lamps is positioned above the cooking region and the second plurality of lamps is positioned below the cooking region. An optical sensor measures an amount of the radiant energy produced by at least one of the second plurality of lamps that is reflected by the cookware in the cooking region. A controller changes an average power level of the second plurality of lamps based upon the amount of radiant energy measured by the optical sensor.

24 Claims, 12 Drawing Sheets

U.S. PATENT DOCUMENTS 2,549,619 4/1951 Miskella ..... 219/411
2,559,249 7/1951 Hudson ..... 219/35
2,767,297 10/1956 Benson ..... 219/35
2,824,943 2/1958 Laughlin ..... 35/215
2,864,932 12/1958 Forrer ..... 219/35
2,924,695 1/1960 Atkeson ..... 219/34
2,939,383 6/1960 Kanaga ..... 99/327
2,980,544 4/1961 Mills ..... 99/229
3,003,409 10/1961 Mills ..... 99/331
3,033,968 11/1962 Julie ..... 219/20
3,037,443 6/1962 Newkirk et al. ..... 99/332
3,119,000 1/1964 Loch et al. ..... 219/19
3,131,280 4/1964 Brussel ..... 219/411
3,249,741 5/1966 Mills ..... 219/388
3,280,720 10/1966 Kohn ..... 99/238.5
3,304,406 2/1967 King ..... 219/411
3,313,917 4/1967 Ditzler et al. ..... 219/400
3,326,692 6/1967 Martino et al. ..... 99/328
3,342,977 9/1967 Anderson ..... 219/548
3,364,338 1/1968 Holtkamp ..... 219/398
3,414,709 12/1968 Tricault ..... 219/411
3,427,435 2/1969 Webb ..... 219/411
3,448,678 6/1969 Burstein ..... 99/386
3,470,942 10/1969 Fukada et al. ..... 219/492
3,559,564 2/1971 Turner et al. ..... 99/332
3,569,656 3/1971 White et al. ..... 219/10.55 B
3,586,823 6/1971 Schier ..... 219/347
3,601,582 8/1971 Boisfleury ..... 219/388
3,621,200 11/1971 Watts, Jr. ..... 219/377
3,626,154 12/1971 Reed ..... 219/411
3,626,155 12/1971 Joeckel ..... 219/411
3,648,010 3/1972 Schier ..... 219/214
3,660,637 5/1972 Grove ..... 219/413
3,666,921 5/1972 Shevlin ..... 219/492
3,682,643 8/1972 Foster ..... 219/405
3,684,860 8/1972 Snyder ..... 219/413
3,688,084 8/1972 Charneski ..... 219/537
3,693,538 9/1972 Snyder ..... 99/447
3,699,307 10/1972 Malkin ..... 219/492
3,713,846 1/1973 Turner et al. ..... 99/217
3,719,789 3/1973 Harnden, Jr. ..... 219/627
3,751,632 8/1973 Kauranen ..... 219/492
3,828,163 8/1974 Amagami et al. ..... 219/413
3,836,751 9/1974 Anderson ..... 219/411
3,847,069 11/1974 Guibert ..... 219/388
3,870,806 3/1975 Capossela et al. ..... 426/221
3,882,255 5/1975 Gorham, Jr. et al. ..... 426/235
3,935,807 2/1976 Main ..... 99/352
3,944,807 3/1976 Frantti et al. .
3,959,620 5/1976 Stephen, Jr. .
4,036,151 7/1977 Shin ..... 108/20
4,092,512 5/1978 Suzuki et al. ..... 219/10.55
4,101,759 7/1978 Anthony ..... 219/405
4,121,078 10/1978 Takano et al. ..... 219/10.55
4,164,591 8/1979 Ahlgren et al. ..... 426/523
4,164,643 8/1979 Peart et al. ..... 219/411
4,191,881 3/1980 Ahlgren et al. ..... 219/388
4,210,794 7/1980 Oguri ..... 219/10.55
4,225,767 9/1980 Hatanaka et al. ..... 219/10.55
4,238,669 12/1980 Huntley ..... 219/405
4,238,995 12/1980 Polster ..... 219/411
4,244,284 1/1981 Flavan et al. ..... 99/327
4,245,148 1/1981 Gisske et al. ..... 219/492
4,276,465 6/1981 Flavio ..... 219/388
4,323,773 4/1982 Carpenter ..... 235/473
4,343,985 8/1982 Wilson et al. ..... 219/214
4,360,726 11/1982 Haden ..... 219/494
4,363,957 12/1982 Tachikawa et al. ..... 219/497
4,367,388 1/1983 Ishihara et al. ..... 219/10.55 B
4,374,319 2/1983 Guibert .
4,379,964 4/1983 Kanazawa et al. ..... 219/492
4,396,817 8/1983 Eck et al. ..... 426/523
4,401,884 8/1983 Kusunoki et al. ..... 426/243
4,410,779 10/1983 Weiss ..... 219/10.55
4,421,015 12/1983 Masters et al. ..... 99/400
4,421,974 12/1983 Oota et al. ..... 219/492
4,441,015 4/1984 Eichelberger et al. ..... 219/411
4,455,479 6/1984 Itoh et al. ..... 219/405
4,462,307 7/1984 Wells ..... 99/386
4,463,238 7/1984 Tanabe ..... 219/10.55 B
4,468,260 8/1984 Hiramoto ..... 219/411
4,481,405 11/1984 Malick ..... 219/405
4,483,631 11/1984 Kydd ..... 364/557
4,486,639 12/1984 Mittelsteadt ..... 219/10.55 B
4,493,960 1/1985 Mittelsteadt et al. .
4,501,944 2/1985 Matsushima ..... 219/10.55
4,506,652 3/1985 Baker ..... 219/388
4,508,960 4/1985 Arai ..... 219/388
4,511,788 4/1985 Arai et al. ..... 219/405
4,516,486 5/1985 Burkhart ..... 99/388
4,554,437 11/1985 Wagner et al. ..... 219/388
4,561,907 12/1985 Raicu ..... 148/187
4,565,704 1/1986 Dagerskog ..... 426/233
4,575,616 3/1986 Bergendal ..... 219/405
4,588,923 5/1986 Hoegler et al. ..... 313/579
4,598,194 7/1986 Halberstadt et al. ..... 219/464
4,601,004 7/1986 Holt et al. ..... 364/557
4,663,557 5/1987 Martin, Jr. et al. ..... 313/112
4,680,421 7/1987 Gat et al. .
4,687,895 8/1987 Chitre et al. ..... 219/10.55 B
4,692,597 9/1987 Tsuda et al. ..... 219/492
4,700,051 10/1987 Goessler et al. ..... 219/464
4,701,663 10/1987 Kawakatsu et al. ..... 313/112
4,721,877 1/1988 Kawakatsu et al. ..... 131/111
4,728,763 3/1988 Bell et al. ..... 219/10.55
4,731,251 3/1988 Javanovic ..... 219/405 X
4,734,562 3/1988 Amano et al. ..... 219/413
4,761,529 8/1988 Tsisios ..... 219/10.55 B
4,771,154 9/1988 Bell et al. ..... 219/405
4,808,798 2/1989 Goessler et al. ..... 219/464
4,816,635 3/1989 Edamura ..... 219/10.55
4,836,138 6/1989 Robinson et al. ..... 118/666
4,871,559 10/1989 Dunn et al. ..... 426/248
4,894,518 1/1990 Ishikawa ..... 219/413
4,910,942 3/1990 Dunn et al. ..... 53/425
4,949,005 8/1990 Parham et al. ..... 313/112
4,960,977 10/1990 Alden ..... 219/388
4,976,194 12/1990 Kelterborn et al. ..... 99/328
4,983,001 1/1991 Haginda et al. ..... 350/1.6
4,999,468 3/1991 Fadel ..... 219/10.55 B
5,034,235 7/1991 Dunn et al. ..... 426/238
5,036,179 7/1991 Westerberg et al. ..... 219/411
5,038,395 8/1991 Lenski ..... 392/420
5,039,535 8/1991 Lang et al. ..... 426/233
5,097,112 3/1992 Kanaya et al. ..... 219/411
5,108,792 4/1992 Anderson et al. ..... 118/725
5,134,263 7/1992 Smith et al. ..... 219/10.55
5,138,219 8/1992 Krisl et al. ..... 313/112
5,147,068 9/1992 Wright ..... 221/9
5,157,239 10/1992 Kanaya et al. ..... 219/411
5,164,161 11/1992 Feathers et al. ..... 219/413
5,171,974 12/1992 Koether et al. ..... 219/506
5,179,265 1/1993 Sheridan et al. ..... 219/497
5,182,439 1/1993 Burkett et al. ..... 219/492
5,183,997 2/1993 Lotz .
5,285,041 2/1994 Wright .
5,308,161 5/1994 Stein .
5,315,092 5/1994 Takahashi et al. .
5,317,130 5/1994 Burkett et al. ..... 219/492
5,319,171 6/1994 Tazawa ..... 219/705
5,352,865 10/1994 Burkett et al. ..... 219/492
5,373,778 12/1994 Moreth ..... 99/421

| | | | |
|---|---|---|---|
| 5,378,872 | 1/1995 | Jovanovic | 219/405 |
| 5,382,441 | 1/1995 | Lentz et al. | 436/411 |
| 5,390,588 | 2/1995 | Krasznai et al. | 99/389 |
| 5,396,047 | 3/1995 | Schilling et al. . | |
| 5,404,420 | 4/1995 | Song | 392/416 |
| 5,420,401 | 5/1995 | Jacqualt et al. . | |
| 5,422,460 | 6/1995 | Bralia et al. . | |
| 5,471,914 | 12/1995 | Krasznai et al. | 99/389 |
| 5,478,986 | 12/1995 | Westerberg | 219/411 |
| 5,517,005 | 5/1996 | Westerberg | 219/405 |
| 5,534,679 | 7/1996 | Beaver, II et al. . | |
| 5,560,285 | 10/1996 | Moreth | 99/421 |
| 5,567,459 | 10/1996 | Gonzalez-Hernandez et al. | 426/241 |
| 5,620,624 | 4/1997 | Westerberg | 219/411 |
| 5,665,259 | 9/1997 | Westerberg | 219/411 |
| 5,674,421 | 10/1997 | Beaver, II et al. | 219/385 |
| 5,695,668 | 12/1997 | Boddy . | |
| 5,695,669 | 12/1997 | Westerberg | 219/411 |
| 5,712,464 | 1/1998 | Westerberg | 219/411 |
| 5,726,423 | 3/1998 | Westerberg et al. . | |
| 5,736,713 | 4/1998 | Westerberg . | |
| 5,786,569 | 7/1998 | Westerberg . | |

FOREIGN PATENT DOCUMENTS

| | | |
|---|---|---|
| 1-154483 | 6/1989 | Japan . |
| 1-315982 | 12/1989 | Japan . |
| 2-89921 | 3/1990 | Japan . |
| 4-080523 | 3/1992 | Japan . |
| 4-361714 | 12/1992 | Japan . |
| 88-717 | 4/1985 | Rep. of Korea . |
| 569 419 | 11/1975 | Switzerland . |
| 1155223 | 5/1985 | U.S.S.R. . |
| 1215651 | 3/1986 | U.S.S.R. . |
| 839551 | 6/1960 | United Kingdom . |
| 1273023 | 5/1972 | United Kingdom . |
| 2132060 | 8/1983 | United Kingdom . |
| 2147788 | 5/1985 | United Kingdom . |
| 2152790 | 8/1985 | United Kingdom . |
| 2180637 | 4/1987 | United Kingdom . |
| 2245136 | 1/1992 | United Kingdom . |
| WO 88/03369 | 5/1988 | WIPO . |
| WO 94/10857 | 5/1994 | WIPO . |
| WO 95/12962 | 5/1995 | WIPO . |

LIGHTWAVE OVEN AND METHOD OF COOKING THEREWITH WITH COOKWARE REFLECTIVITY COMPENSATION

This application claims benefit of provisional application No. 60/059,754 filed Sep. 23, 1997.

FIELD OF THE INVENTION

This invention relates to the field of cooking ovens. More particularly, this invention relates to an improved lightwave oven and method of cooking therewith with radiant energy in infrared, near-visible and visible ranges of the electromagnetic spectrum.

BACKGROUND OF THE INVENTION

Ovens for cooking and baking food have been known and used for thousands of years. Basically, oven types can be categorized in four cooking forms; conduction cooking, convection cooking, infrared radiation cooking and microwave radiation cooking.

There are subtle differences between cooking and baking. Cooking just requires the heating of the food. Baking of a product from a dough, such as bread, cake, crust, or pastry, requires not only heating of the product throughout but also chemical reactions coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long-wave infrared radiation can provide faster heating rates, but it only heats the surface area of most foodstuffs, leaving the internal heat energy to be transferred by much slower conduction. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Radiant cooking methods can be classified by the manner in which the radiation interacts with the foodstuff molecules. For example, starting with the longest wavelengths for cooking, the microwave region, most of the heating occurs because the radiant energy couples into the bipolar water molecules causing them to rotate. Viscous coupling between water molecules converts this rotational energy into thermal energy, thereby heating the food. Decreasing the wavelength to the long-wave infrared regime, the molecules and their component atoms resonantly absorb the energy in well-defined excitation bands. This is mainly a vibrational energy absorption process. In the short-wave infrared region of the spectrum, the main part of the absorption is due to higher frequency coupling to the vibrational modes. In the visible region, the principal absorption mechanism is excitation of the electrons that couple the atoms to form the molecules. These interactions are easily discerned in the visible band of the spectra, where they are identified as "color" absorptions. Finally, in the ultraviolet, the wavelength is short enough, and the energy of the radiation is sufficient to actually remove the electrons from their component atoms, thereby creating ionized states and breaking chemical bonds. This short wavelength, while it finds uses in sterilization techniques, probably has little use in foodstuff heating, because it promotes adverse chemical reactions and destroys food molecules.

Lightwave ovens are capable of cooking and baking food products in times much shorter than conventional ovens. This cooking speed is attributable to the range of wavelengths and power levels that are used.

There is no precise definition for the visible, near-visible and infrared ranges of wavelengths because the perceptive ranges of each human eye is different. Scientific definitions of the "visible" light range, however, typically encompass the range of about 0.39 $\mu$m to 0.77 $\mu$m. The term "near-visible" has been coined for infrared radiation that has wavelengths longer than the visible range, but less than the water absorption cut-off at about 1.35 $\mu$m. The term "infrared" refers to wavelengths greater than about 1.35 $\mu$m. For the purposes of this disclosure, the visible region includes wavelengths between about 0.39 $\mu$m and 0.77 $\mu$m, the near-visible region includes wavelengths between about 0.77 $\mu$m and 1.35 $\mu$m, and the infrared region includes wavelengths greater than about 1.35 $\mu$m.

Typically, wavelengths in the visible range (0.39 to 0.77 $\mu$m) and the near-visible range (0.77 to 1.35 $\mu$m) have fairly deep penetration in most foodstuffs. This range of deep penetration is mainly governed by the absorption properties of water. The characteristic penetration distance for water varies from about 50 meters in the visible to less than about 1 mm at 1.35 microns. Several other factors modify this basic absorption penetration. In the visible region electronic absorption of the food molecules reduces the penetration distance substantially, while scattering in the food product can be a strong factor throughout the region of deep penetration. Measurements show that the typical average penetration distances for light in the visible and near-visible region of the spectrum varies from 2–4 mm for meats to as deep as 10 mm in some baked goods and liquids like non-fat milk.

The region of deep penetration allows the radiant power density that impinges on the food to be increased, because the energy is deposited in a fairly thick region near the surface of the food, and the energy is essentially deposited in a large volume, so that the temperature of the food at the surface does not increase rapidly. Consequently the radiation in the visible and near-visible regions does not contribute greatly to the exterior surface browning.

In the region above 1.35 $\mu$m (infrared region), the penetration distance decreases substantially to fractions of a millimeter, and for certain absorption peaks down to 0.001 mm. The power in this region is absorbed in such a small depth that the temperature rises rapidly, driving the water out and forming a crust. With no water to evaporate and cool the surface the temperature can climb quickly to 300° F. This is the approximate temperature where the set of browning reactions (Maillard reactions) are initiated. As the temperature is rapidly pushed even higher to above 400° F. the point is reached where the surface starts to burn.

It is the balance between the deep penetration wavelengths (0.39 to 1.35 $\mu$m) and the shallow penetration wavelengths (1.35 $\mu$m and greater) that allows the power density at the surface of the food to be increased in the lightwave oven, to cook the food rapidly with the shorter wavelengths and to brown the food with the longer infrared so that a high-quality product is produced. Conventional ovens do not have the shorter wavelength components of radiant energy. The resulting shallower penetration means that increasing the radiant power in such an oven only heats the food surface faster, prematurely browning the food before its interior gets hot.

It should be noted that the penetration depth is not uniform across the deeply penetrating region of the spectrum. Even though water shows a very deep penetration for visible radiation, i.e., many meters, the electronic absorptions of the food macromolecules generally increase in the visible region. The added effect of scattering near the blue end (0.39 μm) of the visible region reduces the penetration even further. However, there is little real loss in the overall average penetration because very little energy resides in the blue end of the blackbody spectrum.

Conventional ovens operate with radiant power densities as high as about 0.3 W/cm$^2$ (i.e. at 400° F.). The cooking speeds of conventional ovens cannot be appreciably increased simply by increasing the cooking temperature, because increased cooking temperatures drive water off the food surface and cause browning and searing of the food surface before the food's interior has been brought up to the proper temperature. In contrast, lightwave ovens have been operated from approximately 0.8 to 5 W/cm$^2$ of visible, near-visible and infrared radiation, which results in greatly enhanced cooking speeds. The lightwave oven energy penetrates deeper into the food than the radiant energy of a conventional oven, thus cooking the food interior faster. Therefore, higher power densities can be used in a lightwave oven to cook food faster with excellent quality. For example, at about 0.7 to 1.3 W/cm$^2$, the following cooking speeds have been obtained using a lightwave oven:

| Food | Cook Time |
|---|---|
| pizza | 4 minutes |
| steaks | 4 minutes |
| biscuits | 7 minutes |
| cookies | 11 minutes |
| vegetables (asparagus) | 4 minutes |

For high-quality cooking and baking, the applicants have found that a good balance ratio between the deeply penetrating and the surface heating portions of the impinging radiant energy is about 50:50, i.e., Power(0.39 to 1.35 μm)/Power(1.35 μm and greater) ≈1. Ratios higher than this value can be used, and are useful in cooking especially thick food items, but radiation sources with these high ratios are difficult and expensive to obtain. Fast cooking can be accomplished with a ratio substantially below 1, and it has been shown that enhanced cooking and baking can be achieved with ratios down to about 0.5 for most foods, and lower for thin foods, e.g., pizza and foods with a large portion of water, e.g., meats. Generally the surface power densities must be decreased with decreasing power ratio so that the slower speed of heat conduction can heat the interior of the food before the outside burns. It should be remembered that it is generally the burning of the outside surface that sets the bounds for maximum power density that can be used for cooking. If the power ratio is reduced below about 0.3, the power densities that can be used are comparable with conventional cooking and no speed advantage results.

If blackbody sources are used to supply the radiant power, the power ratio can be translated into effective color temperatures, peak intensities, and visible component percentages. For example, to obtain a power ratio of about 1, it can be calculated that the corresponding blackbody would have a temperature of 3000° K, with a peak intensity at 0.966 μm and with 12% of the radiation in the full visible range of 0.39 to 0.77 μm. Tungsten halogen quartz bulbs have spectral characteristics that follow the blackbody radiation curves fairly closely. Commercially available tungsten halogen bulbs have successfully been used with color temperatures as high as 3400° K. Unfortunately, the lifetime of such sources falls dramatically at high color temperatures (at temperatures above 3200° K it is generally less that 100 hours). It has been determined that a good compromise in bulb lifetime and cooking speed can be obtained for tungsten halogen bulbs operated at about 2900–3000° K. As the color temperature of the bulb is reduced and more shallow-penetrating infrared is produced, the cooking and baking speeds are diminished for quality product. For most foods there is a discernible speed advantage down to about 2500° K (peak at about 1.2 μm; visible component of about 5.5%) and for some foods there is an advantage at even lower color temperatures. In the region of 2100° K the speed advantage vanishes for virtually all foods that have been tried.

In a conventional oven, the reflectivity of cookware used to support the foodstuff can have a noticeable effect on the cooking process. For example, cookies that properly bake on an aluminum cooking sheet at 350° F. may burn slightly on the bottom if baked on a dark steel pan. To compensate, the baking temperature might have to be reduced to 325° F. Some manufacturers of very dark, non-reflective cookware include instructions to lower the oven temperature by 25 degrees for certain food recipes. The effect of cookware reflectivity on conventional oven baking/cooking is not terribly significant, however, because conventional baking/cooking results from a combination of radiation and convection.

In a lightwave oven, however, most of the heat transfer is by radiation. It has been discovered that the amount of radiation absorbed by cookware supporting the foodstuff in a lightwave oven greatly varies depending upon the reflectivity of the cookware. Cookware with low reflectivity, thus high absorption of the lightwave oven radiation, can reach temperatures that are hundreds of degrees greater than highly reflective cookware used at the same lightwave oven intensity. Since the cookware bottom surface is usually in direct contact with the foodstuff, and is usually the closest cookware surface to the lightwave oven lamps, cookware reflectivity is one of the largest variables in the cooking (and/or baking) process in a lightwave oven. When food is present on the cookware, the energy that would increase cookware temperature by hundreds of degrees is coupled to the food, whereby the food temperature rises faster and higher resulting in enhanced cooking, browning and burning of the food. Further, highly absorbing cookware can affect the average power density inside the oven cavity.

There are countless different types of cookware available for use in a lightwave oven, each with their own reflectivity characteristics. The cookware temperature differentials from varying reflectivities make it very difficult to estimate power and cook time settings in a lightwave oven without burning the foodstuff bottom or end up with undercooked food. Further, some cookware have reflectivity characteristics that change as the cookware ages, gets tarnished, is not cleaned well, or conceivably even as the cookware heats up.

One possible solution is for the user to visually inspect the cookware before use, estimate the effect of its reflectivity on the cooking sequence, and then adjust the lightwave cooking recipe accordingly. However, this would involve much trial and error with very little precision. Further, the naked eye is not good at measuring the reflectivity of any given material for the visible, near-visible and infrared light produced by the lightwave oven. Lastly, in the age of automation, it is not desirable for the user of a lightwave oven, especially users in the home, to have to take into account the reflectivity characteristics of their cookware each time they operate their lightwave oven.

There is a need for a lightwave oven and method of cooking therewith that can consistently and reliably cook and bake foods irrespective of cookware reflectivity.

SUMMARY OF THE INVENTION

It is an object of the present invention to provide a lightwave oven that cooks or bakes foods consistently and reliably irrespective of cookware reflectivity.

It is yet another object of the present invention to provide a method of operating a lightwave to produce quality cooking or baking, irrespective of cookware reflectivity.

The present invention solves the above mentioned problems by using the radiant energy from the lightwave oven lamps during the cooking cycle to automatically measure and compensate for cookware reflectivity.

One aspect of the present invention is a method of cooking food contained in cookware placed in a cooking region of a lightwave oven having an upper plurality of high power lamps positioned above the cooking region and a lower plurality of high power lamps positioned below the cooking region providing radiant energy in the electromagnetic spectrum including the infrared, near-visible and visible ranges. The method includes operating at least one of the lower plurality of lamps at an average power level, measuring an amount of the radiant energy produced by the at least one lower plurality lamp that is reflected by cookware in the cooking region, and changing the average power level of the at least one lower plurality lamp based upon the measured amount of radiant energy.

In another aspect of the present invention, the method includes operating the lower plurality of lamps at an average power level, measuring an amount of the radiant energy produced by the lower plurality of lamps that is reflected by cookware in the cooking region, and changing the average power level of the lower plurality of lamps based upon the measured amount of radiant energy.

In yet another aspect of the present invention, a lightwave oven for cooking food contained in cookware includes an oven cavity housing enclosing a cooking region therein, and an upper plurality and a lower plurality of high power lamps that provide radiant energy in the visible, near-visible and infrared ranges of the electromagnetic spectrum. The upper plurality of lamps are positioned above the cooking region and the lower plurality of lamps are positioned below the cooking region. An optical sensor measures an amount of the radiant energy produced by at least one of the lower plurality of lamps that is reflected by cookware in the cooking region. A controller operates the at least one lower plurality lamp at an average power level that varies depending upon the amount of radiant energy measured by the optical sensor.

In still yet another aspect of the present invention, the optical sensor measures an amount of the radiant energy produced by the lower plurality of lamps that is reflected by cookware in the cooking region, and the controller operates the lower plurality of lamps at an average power level that varies depending upon the amount of radiant energy measured by the optical sensor.

Other objects and features of the present invention will become apparent by a review of the specification, claims and appended figures.

DETAILED DESCRIPTION OF THE PREFERRED EMBODIMENT

The present invention is a lightwave oven and method of cooking therewith that measures the reflectivity of the cookware used therein, and automatically adjusts the cooking or baking sequence of the lightwave oven accordingly for optimally cooked or baked food.

Figure 1A:
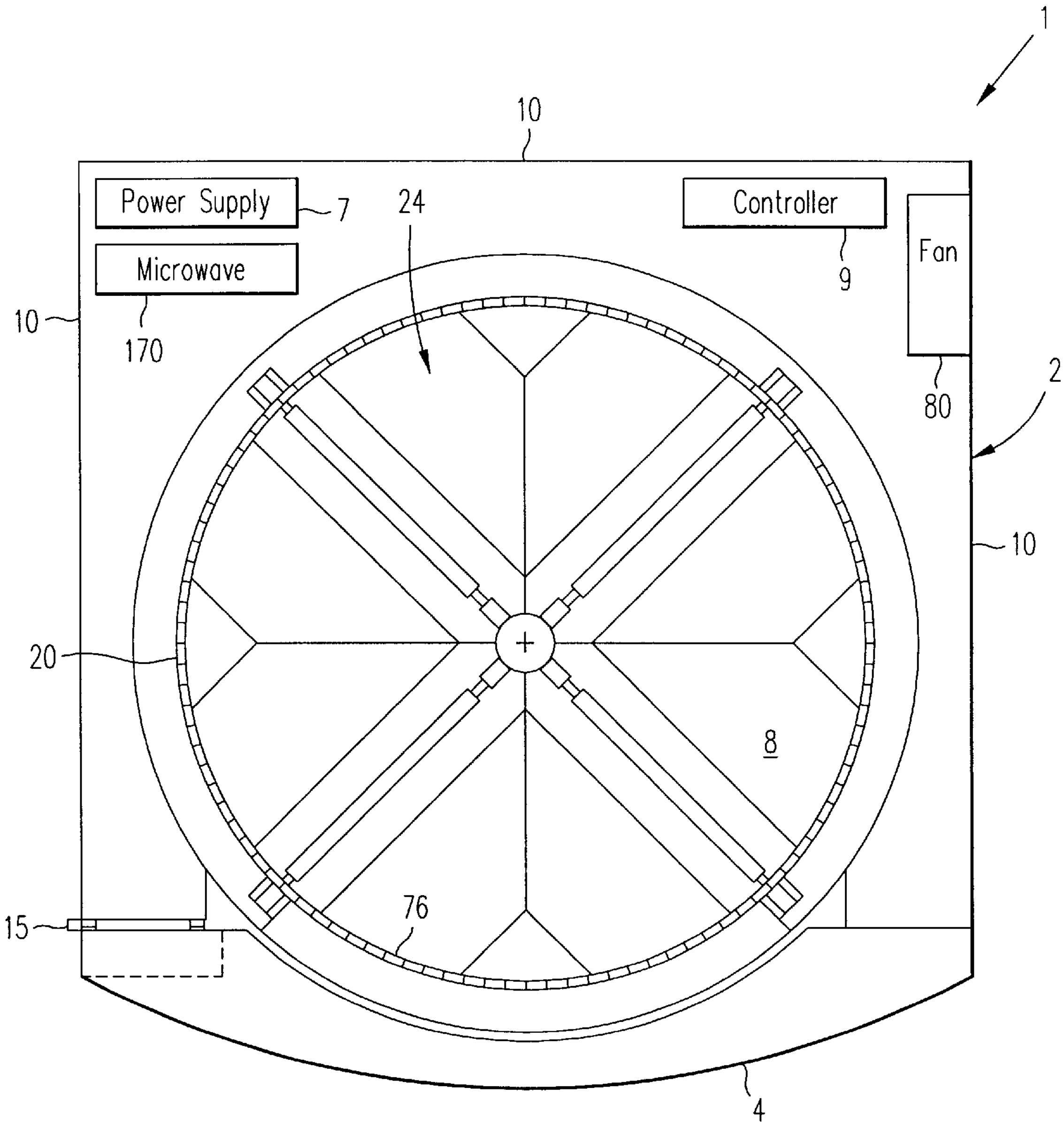
FIG. 1A is a top cross-sectional view of a lightwave oven.
Figure 1B:
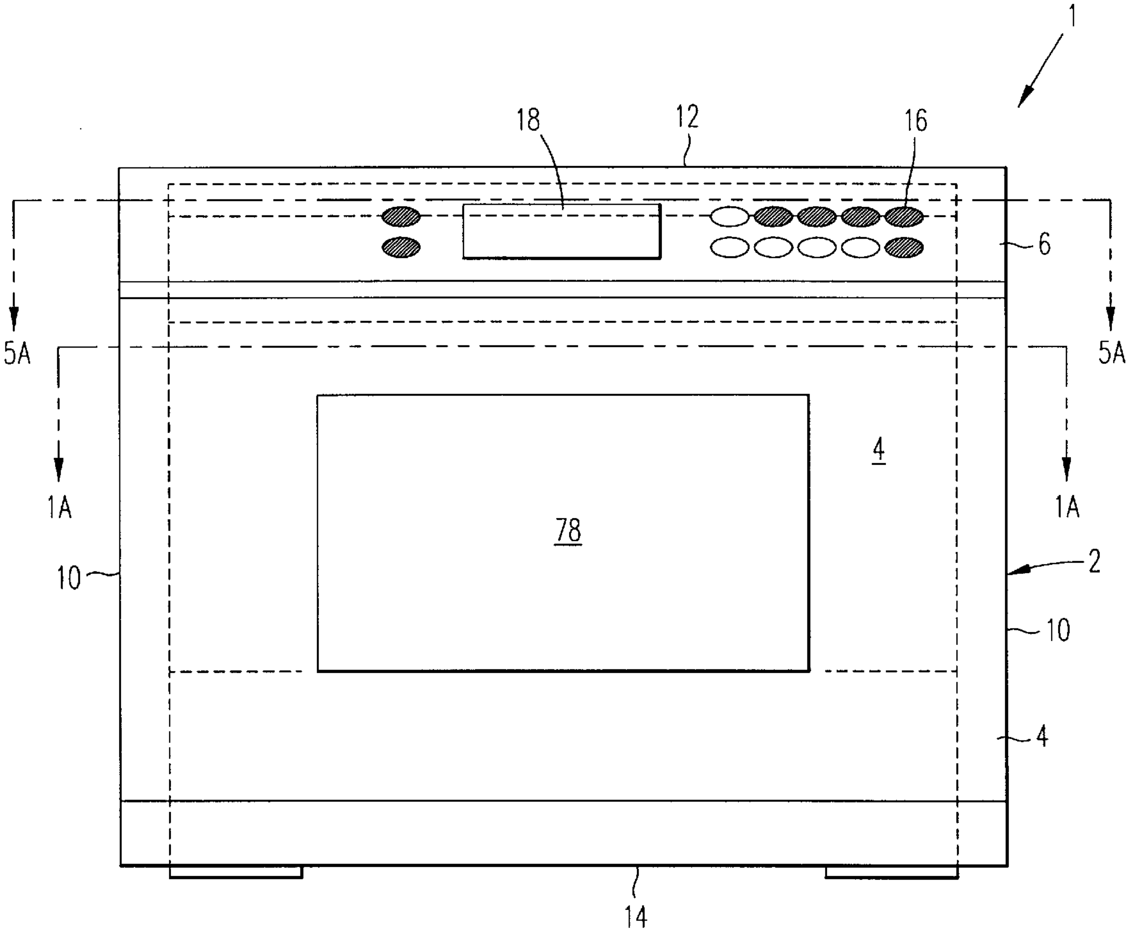
FIG. 1B is a front view of the lightwave oven.
Figure 1C:
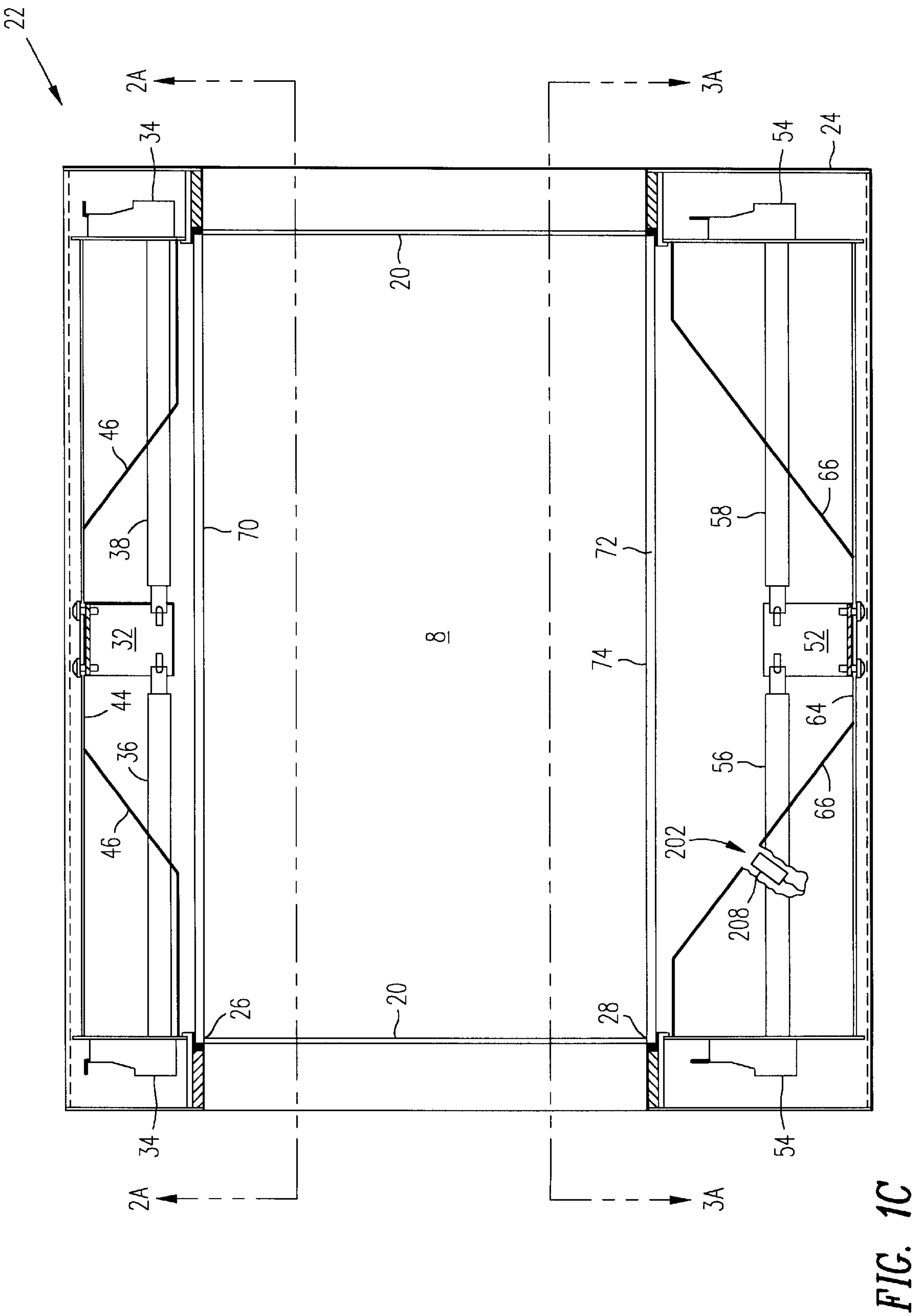
FIG. 1C is a side cross-sectional view of the lightwave oven.

Cookware reflectivity compensation of the present invention is described using a high efficiency cylindrically shaped oven 1 illustrated in FIGS. 1A–1C, but can be incorporated in any lightwave oven design.

The lightwave oven 1 includes a housing 2, a door 4, a control panel 6, a power supply 7, an oven cavity 8, and a controller 9.

The housing 2 includes sidewalls 10, top wall 12, and bottom wall 14. The door 4 is rotatably attached to one of the sidewalls 10 by hinges 15. Control panel 6, located above the door 4 and connected to controller 9, contains several operation keys 16 for controlling the lightwave oven 1, and a display 18 indicating the oven's mode of operation.

The oven cavity 8 is defined by a cylindrical-shaped sidewall 20, an upper reflector assembly 22 at an upper end 26 of sidewall 20, and a lower reflector assembly 24 at the lower end 28 of sidewall 20.

Figure 2B:
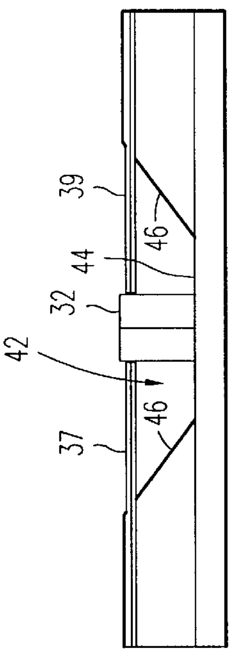
FIG. 2B is a side cross-sectional view of the upper reflector assembly of the lightwave oven.
Figure 2A:
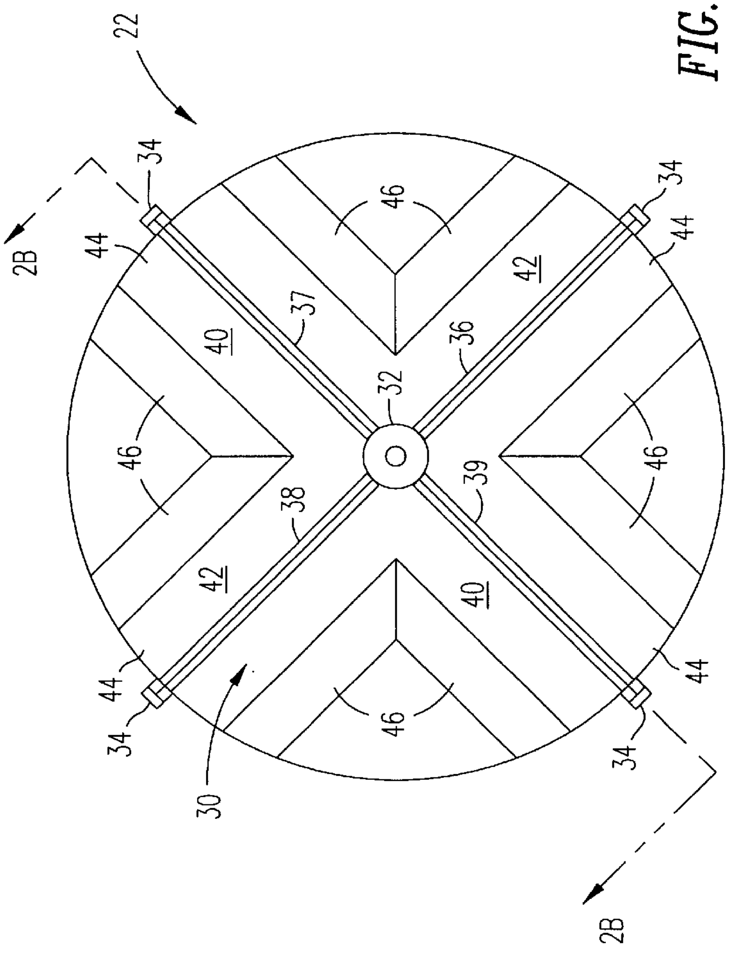
FIG. 2A is a bottom view of the upper reflector assembly of the lightwave oven.
Figure 2C:
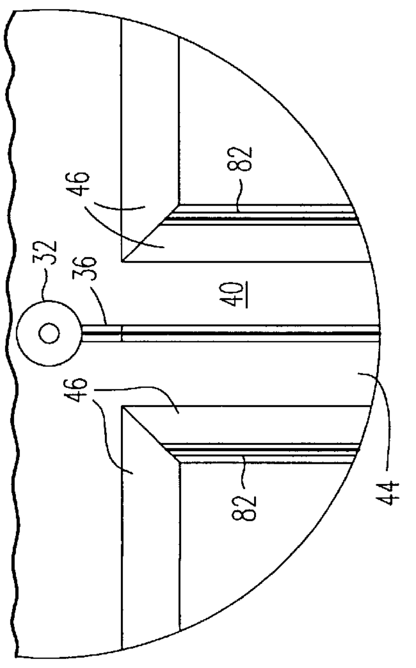
FIG. 2C is a partial bottom view of the upper reflector assembly of the lightwave oven illustrating the virtual images of one of the lamps.

Upper reflector assembly 22 is illustrated in FIGS. 2A–2C and includes a circular, non-planar reflecting surface 30 facing the oven cavity 8, a center electrode 32disposed at the center of the reflecting surface 30, four outer electrodes 34 evenly disposed at the perimeter of the reflecting surface 30, and four upper lamps 36, 37, 38, 39 each radially extending from the center electrode to one of the outer electrodes 34 and positioned at 90 degrees to the two adjacent lamps. The reflecting surface 30 includes a pair of linear channels 40 and 42 that cross each other at the center of the reflecting surface 30 at an angle of 90 degrees to each other. The lamps 36–39 are disposed inside of or directly over channels 40/42. The channels 40/42 each have a bottom reflecting wall 44 and a pair of opposing planar reflecting sidewalls 46 extending parallel to axis of the corresponding lamp 36–39. (Note that for bottom reflecting wall 44, "bottom" relates to its relative position with respect to channels 40/42 in their abstract, even though when installed wall 44 is above sidewalls 46.) Opposing sidewalls 46 of each channel 40/42 slope away from each other as they extend away from the bottom wall 44, forming an approximate angle of 45 degrees to the plane of the upper cylinder end 26.

Figure 3B:
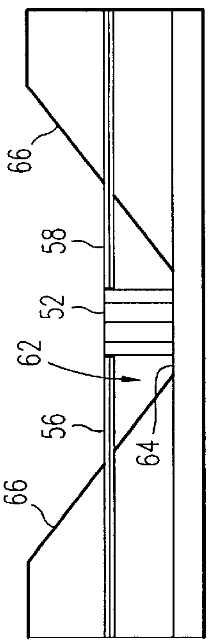
FIG. 3B is a side cross-sectional view of the lower reflector assembly of the lightwave oven.
Figure 3D:
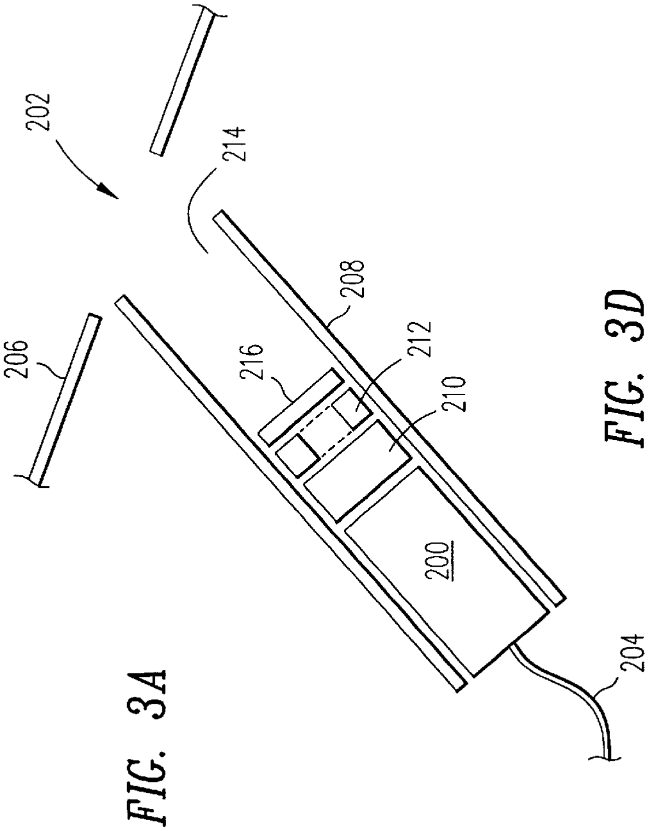
FIG. 3D is a side cross-sectional view illustrating the cookware reflection compensation sensor of the present invention.
Figure 3A:
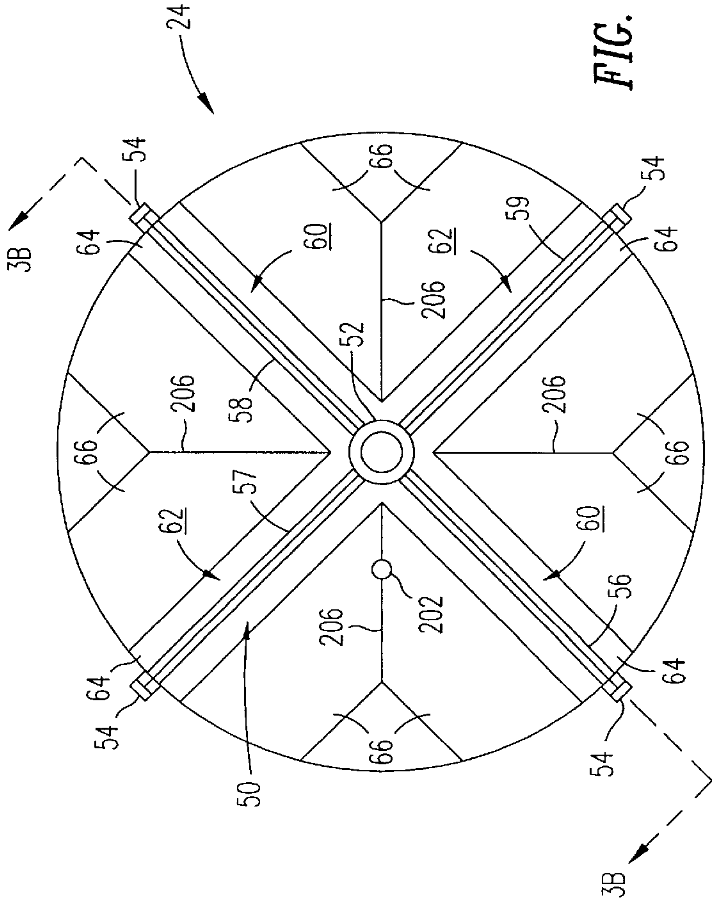
FIG. 3A is a top view of the lower reflector assembly of the lightwave oven.
Figure 3C:
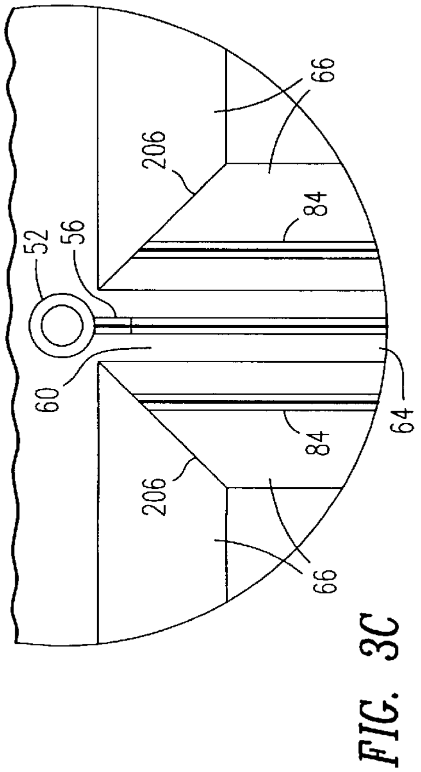
FIG. 3C is a partial top view of the lower reflector assembly of the lightwave oven illustrating the virtual images of one of the lamps.

Lower reflector assembly 24 illustrated in FIGS. 3A–3C has a similar construction as upper reflector 22, with a circular, non-planar reflecting surface 50 facing the oven cavity 8, a center electrode 52 disposed at the center the reflecting surface 50, four outer electrodes 54 evenly disposed at the perimeter of the reflecting surface 50, and four lower lamps 56, 57, 58, 59 each radially extending from the center electrode to one of the outer electrodes 54 and positioned at 90 degrees to the two adjacent lamps. The reflecting surface 50 includes a pair of linear channels 60 and 62 that cross each other at the center of the reflecting surface 50 at an angle of 90 degrees to each other. The lamps 56–59 are disposed inside of or directly over channels 60/62. The channels 60/62 each have a bottom reflecting wall 64 and a pair of opposing planar reflecting sidewalls 66 extending parallel to axis of the corresponding lamp 56–59. Opposing sidewalls 66 of each channel 60/62 slope away from each other as they extend away from the bottom wall 64, forming an approximate angle of 45 degrees to the plane of the lower cylinder end 28.

Power supply 7 is connected to electrodes 32, 34, 52 and 54 to operate, under the control of controller 9, each of the lamps 36–39 and 56–59 individually.

To keep foods from splattering cooking juices onto the lamps and reflecting surfaces 30/50, transparent upper and lower shields 70 and 72 are placed at the cylinder ends 26/28 covering the upper/lower reflector assemblies 22/24 respectively. Shields 70/72 are plates made of a glass or a glass-ceramic material that has a very small thermal expansion coefficient. For the preferred embodiment glass-ceramic material available under the trademarks Pyroceram, Neoceram and Robax, and the borosilicate glass material available under the name Pyrex, have been successfully used. These lamp shields isolate the lamps and reflecting surfaces 30/50 so that drips, food splatters and food spills do not affect operation of the oven, and they are easily cleaned since each shield 70/72 consists of a single, circular plate of glass or glass-ceramic material.

While food is usually cooked in glass or metal cookware placed on the lower shield 72, it has been discovered that glass or glass-ceramic materials not only work well as a lamp shield, but also provide an effective surface to cook and bake upon. Therefore, the upper surface 74 of lower shield 72 serves as a cooktop. There are several advantages to providing such a cooking surface within the oven cavity. First, food can be placed directly on the cooktop 74 without the need for pans, plates or pots. Second, the radiation transmission properties of glass and glass-ceramic change rapidly at wavelengths near the range of 2.5 to 3.0 microns. For wavelengths below this range, the material is very transparent and above this range it is very absorptive. This means that the deeply penetrating visible and near-visible radiation can impinge directly on the foodstuff from all sides, while the longer infrared radiation is partially absorbed in the shields 70/72, heating them and thereby indirectly heating foodstuff in contact with surface 74 of shield 72. The conduction of the heat within the shield 72 evens out the temperature distribution in the shield and causes uniform heating of the foodstuff, which results in superior uniformity of food browning compared to radiation alone. Third, because the heating of the foodstuff is accomplished with no utensils, the cook times are generally shorter, since extra energy is not expended on heating the utensils. Typical foods that have been cooked and baked directly on cooktop 74 include pizza, cookies, biscuits, french fries, sausages, and chicken breasts.

Upper and lower lamps 36–39 and 56–59 are generally any of the quartz body, tungsten-halogen or high intensity discharge lamps commercially available, e.g., 1 KW 120 VAC quartz-halogen lamps. The oven according to the preferred embodiment utilizes eight tungsten-halogen quartz lamps, which are about 7 to 7.5 inches long and cook with approximately fifty percent (50%) of the energy in the visible and near-visible light portion of the spectrum at full lamp power.

Door 4 has a cylindrically shaped interior surface 76 that, when the door is closed, maintains the cylindrical shape of the oven cavity 8. A window 78 is formed in the door 4(and surface 76) for viewing foods while they cook. Window 78 is preferably curved to maintain the cylindrical shape of the oven cavity 8.

In the oven of the present invention, the inner surface of cylinder sidewall 20, door inner surface 76 and reflective surfaces 30 and 50 are formed of a highly reflective material made from a thin layer of high reflecting silver sandwiched between two plastic layers and bonded to a metal sheet, having a total reflectivity of about 95%. Such a highly-reflective material is available from Alcoa under the tradename EverBrite 95, or from Material Science Corporation under the tradename Specular+SR.

The window portion 78 of the preferred embodiment is formed by bonding the two plastic layers surrounding the reflecting silver to a transparent substrate such as plastic or glass (preferably tempered), instead of sheet metal that forms the rest of the door's substrate. It has been discovered that the amount of light that leaks through the reflective material used to form the interior of the oven is ideal for safely and comfortably viewing the interior of the oven cavity while food cooks.

It should also be noted that cylindrical sidewall 20 need not have a perfect cylinder shape to provide enhanced efficiency. Octagonal mirror structures have been used as an approximation to a cylinder, and have shown an increased efficiency over and above the rectangular box. In fact, any additional number of planar sides greater than the four of the standard box provides increased efficiency, and it is believed the maximum effect would accrue when the number of walls in such multi-walled configurations are pushed to their limit (i.e. the cylinder). The oven cavity can also have an elliptical cross-sectional shape, which has the advantage of fitting wider pan shapes into the cooking chamber compared to a cylindrical oven with the same cooking area. The cylindrical configuration of the oven means there are no hard to clean corners in the oven cavity.

Upper and lower reflector assemblies 22/24 provide a very uniform illumination field inside cavity 8, which eliminates the need to rotate the food for even cooking. A simple flat back-plane reflector behind the lamps would not give uniform illumination in a radial direction because the gap between the lamps increases as the distance from the center electrodes 32/52 increases. It has been discovered that this gap is effectively filled-in with lamp reflections from the channel sidewalls 46/66. FIGS. 2C and 3C illustrate the virtual lamp images 82/84 of one of the lamps 36/56, which fill in the spaces between the lamps near sidewall 20 with radiation directed into the oven cavity 8. From this it can be seen that the outer part of the cylinder field is effectively filled-in with the reflected lamp positions to give enhanced uniformity. Across this cylinder plane, a flat illumination has been produced within a variation of +5% across a diameter of 12 inches measured 3 inches away from the lamp plane. For cooking purposes this variance shows adequate uniformity and a turntable is not necessary to cook food evenly.

The direct radiation from the lamps, combined with the reflections off of the non-planar reflecting surfaces 30/50, evenly irradiate the entire volume of the oven cavity 8. Further, any light missing the foodstuff, or reflected off of the foodstuff surface, is reflected by the cylindrical sidewall and reflecting surfaces 30/50 so that the light is redirected back to the foodstuff.

Due to the proximity of lower reflector assembly 22 to the cooktop 74, lower reflector assembly 22 is taller than upper reflector assembly 24, and therefore channels 60/62 are deeper than channels 40/42. This configuration positions lower lamps 56–59 further away from cooktop 74 (upon which the foodstuff sits). The increased distance of cooktop 74 from lamps 56–59, and the deeper channels 60/62, were found necessary to provide more even cooking at cooktop 74.

Water vapor management, water condensation and airflow control in the cavity 8 can significantly affect the cooking of the food inside oven 1. It has been found that the cooking properties of the oven (i.e., the rate of heat rise in the food and the rate of browning during cooking) is strongly influenced by the water vapor in the air, the condensed water on the cavity sides, and the flow of hot air in the cylindrical chamber. Increased water vapor has been shown to retard the browning process and to negatively affect the oven efficiency. Therefore, the oven cavity 8 need not be sealed completely, to let moisture escape from cavity 8 by natural convection. Moisture removal from cavity 8 can be enhanced through forced convention. A fan 80, which can be controlled as part of the cooking formulas discussed below, provides a source of fresh air that is delivered to the cavity 8 to optimize the cooking performance of the oven.

Figure 4A:
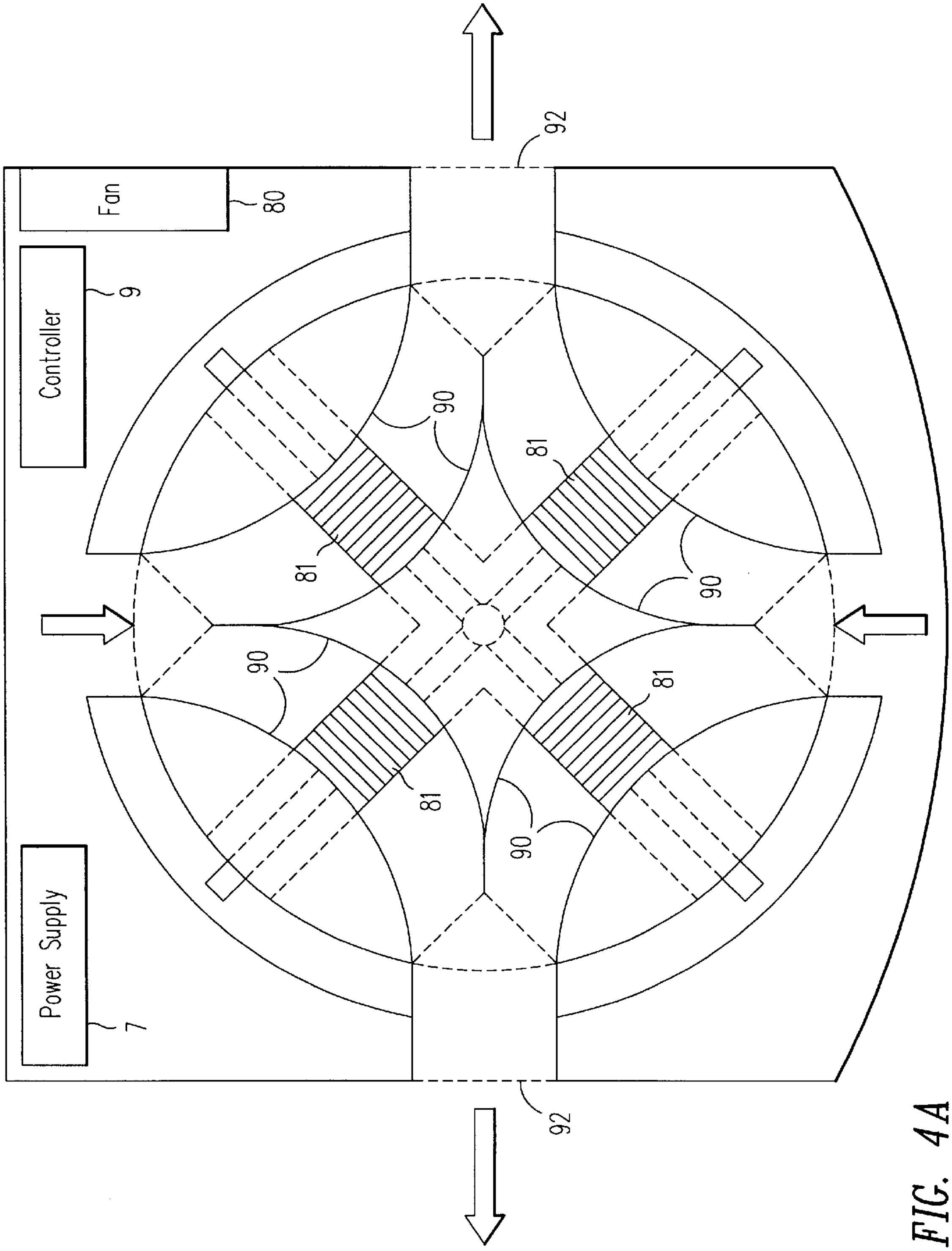
FIG. 4A is a top cross-sectional view of the upper portion of lightwave oven.
Figure 4B:
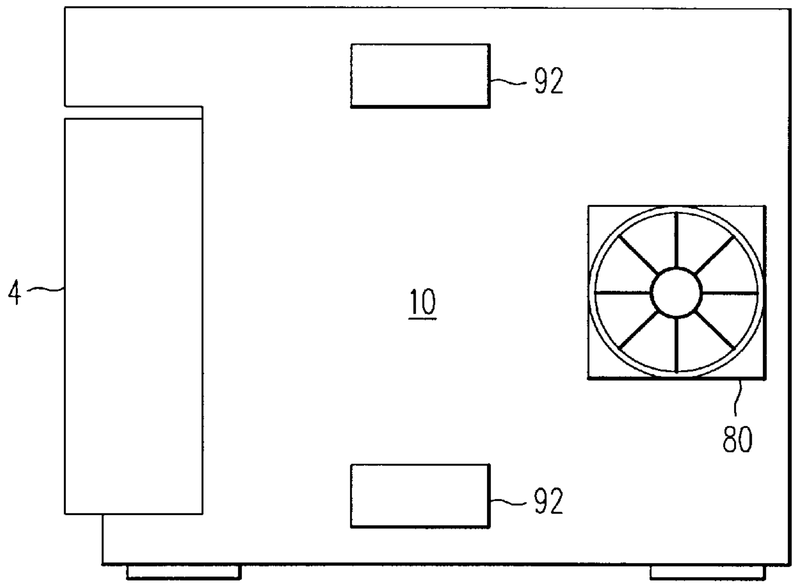
FIG. 4B is a side view of the housing for the lightwave oven.

Fan 80 also provides fresh cool air that is used to cool the high reflectance internal surfaces of the oven cavity 8, as illustrated in FIGS. 4A and 4B. During operation, reflecting surfaces 30/50, and sidewall 20, if left uncooled, could reach very high temperatures that can damage these surfaces. Therefore, fan 80 creates a positive pressure within the oven housing 2 which, in effect, creates a large cooking air manifold. The pressure within the housing 2 causes cooling air to flow over the back surface of cylindrical sidewall 20 and into integral ducting 90 formed between each of the reflector assemblies 30/50 and the housing 2. It is most important to cool the back side portions of bottom wall 44/64 and sidewalls 46/66 that are in the closest proximity to the lamps. To enhance the cooling efficiency of these areas of reflector assemblies 24/26, cooling fins 81 are bonded to the backside of reflecting surfaces 30/50 and positioned in the airstream of cooling air flowing through ducting 90. The cooling air flows in through fan 80, over the back surface of cylindrical sidewall 20, through ducting 90, and out exhaust ports 92 located on the oven's sidewalls 10.

The airflow from fan 80 can further be used to cool the oven power supply 7 and controller 9. FIG. 4A illustrates the cooling ducts for upper reflector assembly 22. Ducting 90 and fins 81 are formed under reflector assembly 24 in a similar manner.

One drawback to using the 95% reflective silver layer sandwiched between two plastic layers is that it has a lower heat tolerance than the 90% reflective high purity aluminum. This can be a problem for reflective surfaces 30 and 50 of the reflector assemblies 22/24 because of the proximity of these surfaces to the lamps. The lamps can possibly heat the reflective surfaces 30/50 above their damage threshold limit. One solution is a composite oven cavity, where reflective surfaces 30 and 50 are formed of the more heat resistant high purity aluminum, and the cylindrical sidewall reflective surface 20 is made of the more reflective silver layer. The reflective surfaces 30/50 will operate at higher temperatures because of the reduced reflectivity, but still well below the damage threshold of the aluminum material. In fact, the damage threshold is high enough that fins 81 probably are not necessary. This combination of reflective surfaces provides high oven efficiency while minimizing the risk of reflector surface damage by the lamps.

Figure 5:
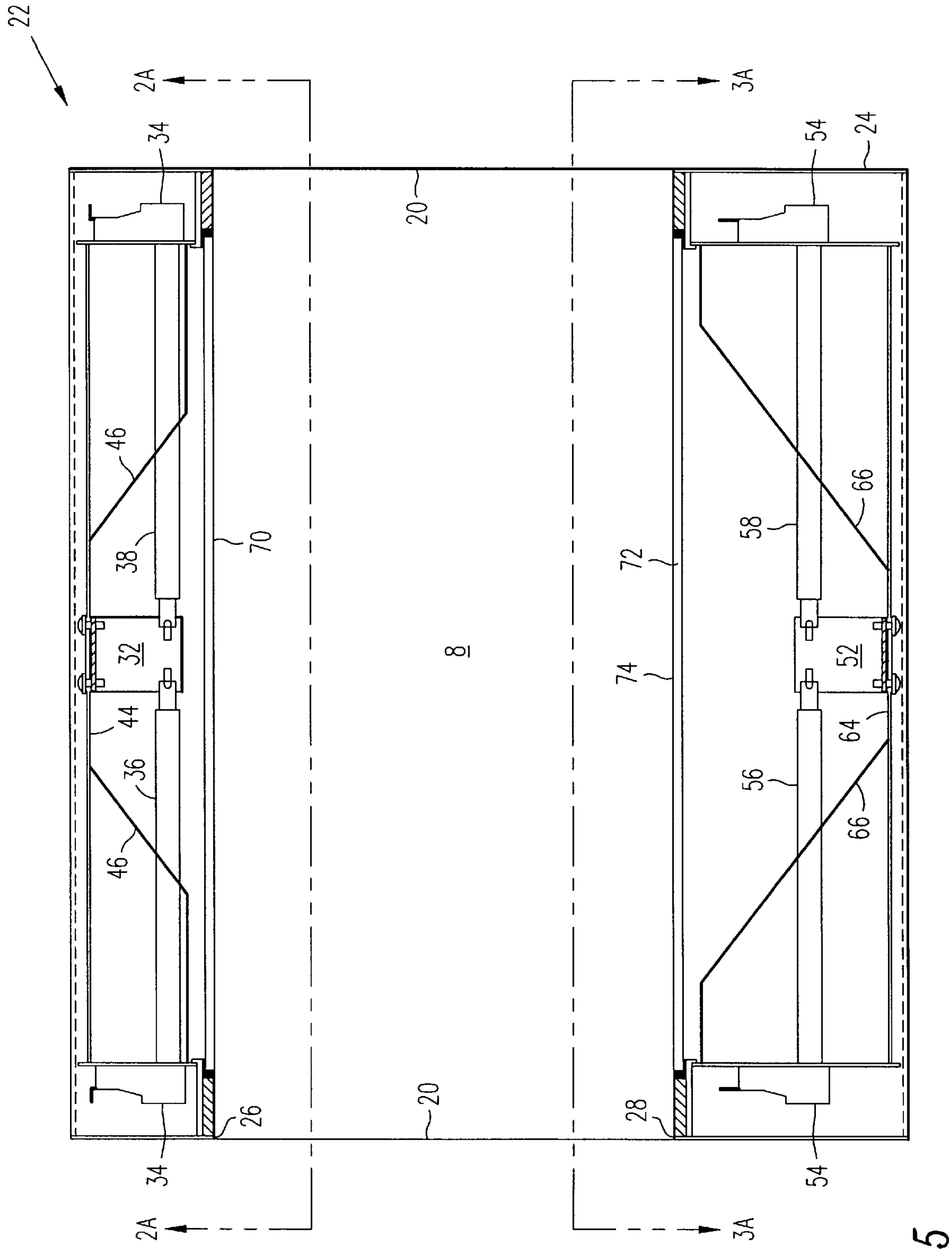
FIG. 5 is a side cross-sectional view of another alternate embodiment of the lightwave oven.
Figure 6:
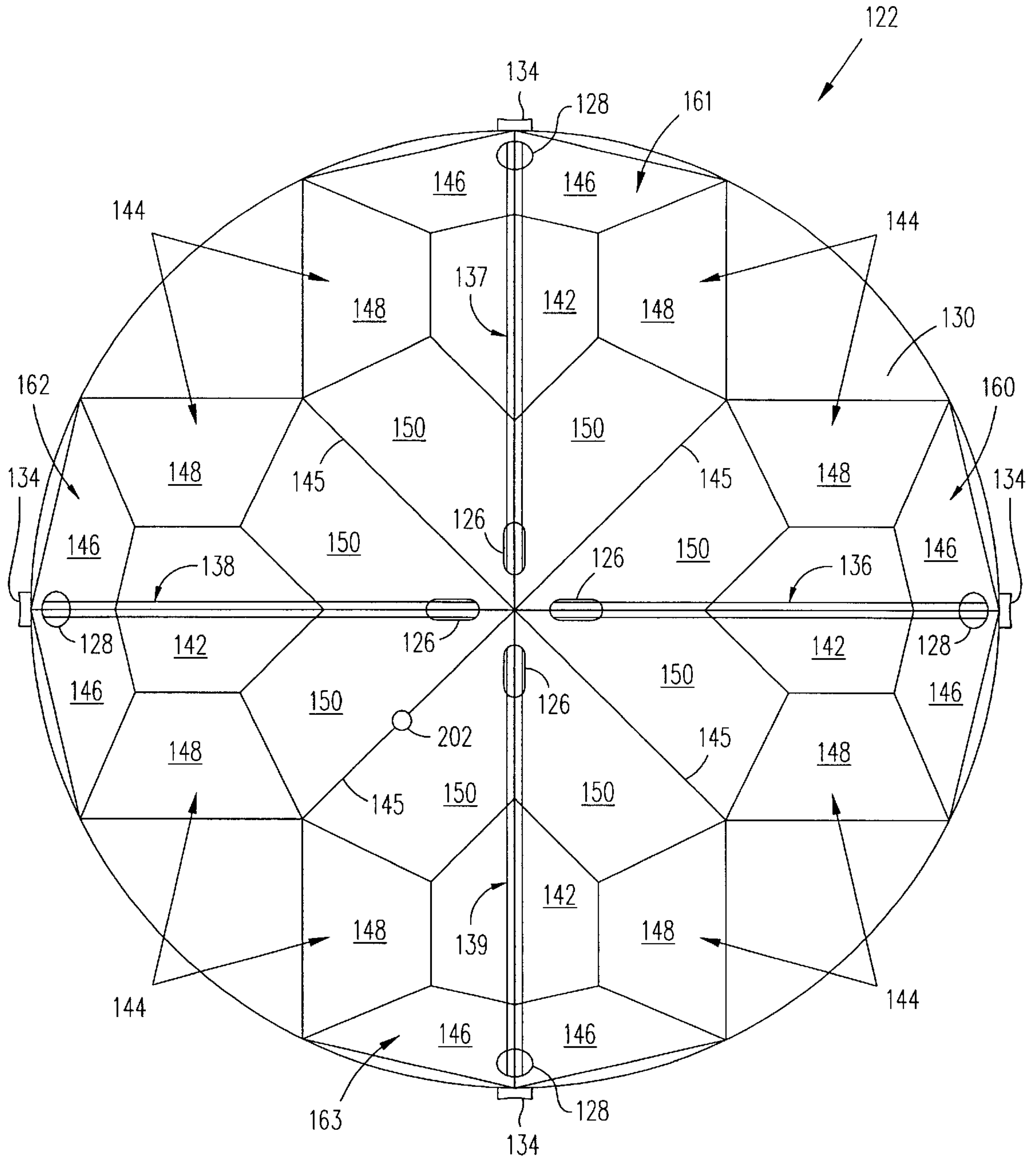
FIG. 6 is a top view of an alternate embodiment reflector assembly for the lightwave oven, which includes reflector cups underneath the lamps.
Figure 7A:
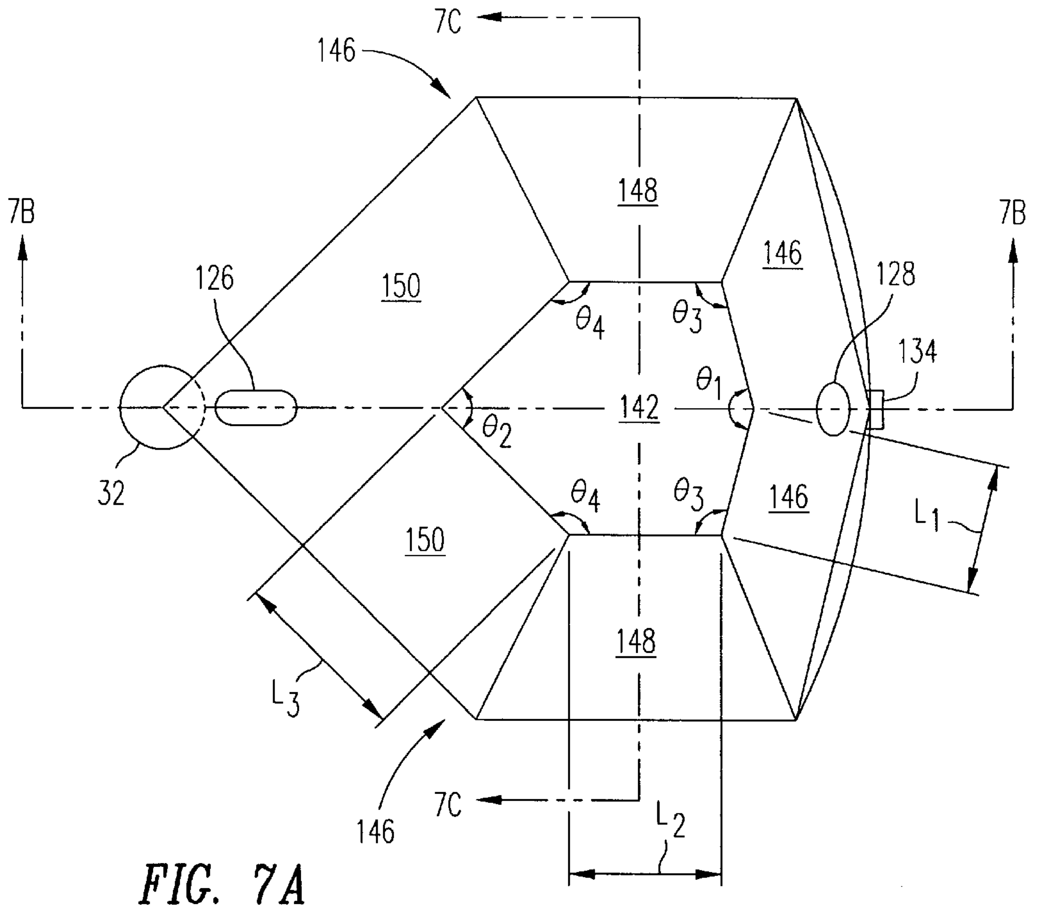
FIG. 7A is a top view of one of the reflector cups for the alternate embodiment reflector assembly of the lightwave oven.
Figure 7B:
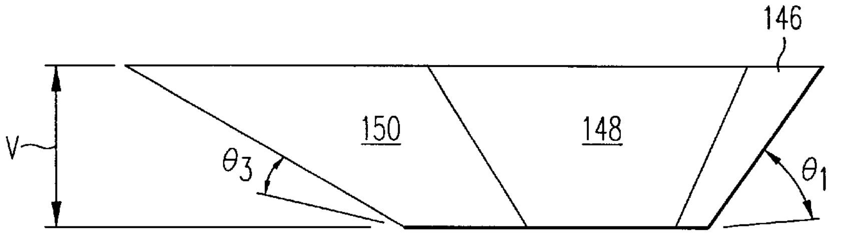
FIG. 7B is a side cross-sectional view of the reflector cup of FIG. 7A.
Figure 7C:
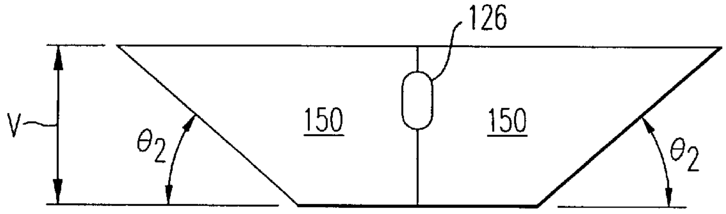
FIG. 7C is an end cross-sectional view of the reflector cup of FIG. 7A.

It should be noted that the shape or size of cavity 8 need not match the shape/size of upper/lower reflector assemblies 22/24. For example, the cavity 8 can have a diameter that is larger than that of the reflector assemblies, as illustrated in FIG. 5. This allows for a larger cooking area with little or no reduction in oven efficiency. Alternately, the cavity 8 can have an elliptical cross-section, with reflector assemblies 22/24 that are matched in shape (e.g. elliptical with channels 40/42, 60/62 not crossing perpendicular to each other), or have a more circular shape than the cavity 8.

While all eight lamps could operate simultaneously at full power if an adequate electrical source was available, the lightwave oven lamps can be sequentially operated in a staggered manner, where different selected lamps from above and below the food can be sequentially switched on and off at different times to provide a uniform time-averaged power density without having more than a predetermined number of lamps (e.g. two) operating at any given time.

For example, one lamp above and one lamp below the cooking region can be turned on for a period of time (e.g. 15 seconds). Then, they are turned off and two other lamps are turned on for 15 seconds, and so on. By sequentially operating the lamps by applying power thereto in this staggered manner, a cooking region far too large to be evenly illuminated by only two lamps is in fact evenly illuminated when averaged over time using eight lamps with no more than two activated at once. Further, some lamps may be skipped or have operation times reduced to provide different amounts of energy to different portions of the food surface.

Turning down the operating voltage to the lamps to significantly reduce the oven power intensity adversely affects the spectral output of the lamps. Specifically, lowering a lamp's operating voltage shifts the spectral output of the lamp toward the infrared, thus reducing or eliminating the visible and near-visible radiation needed for effective cooking/baking. However, sequential operation of the upper and lower lamps in a staggered manner can be varied to provide different power densities in the oven while running the lamps at their full operating voltage. For example, the following parameters of lamp sequential operation can be varied to change the amount of energy impinging the food surfaces: the number of lamps on at any given time, the overlap time between one lamp being turned on and another being turned off, the delay time between one lamp being turned off and another being turned on, etc. These changes allow the lightwave oven to generate different power levels inside the oven without adversely affecting the color temperature of the lamps.

Cookware reflectivity compensation according to the present invention is accomplished by using an optical sensor 200 mounted below a small hole 202 formed in reflective surface 50 of the lower reflector assembly 24, as illustrated in FIGS. 3A and 3D. The sensor is a photodetector, preferably a silicon photo transistor or diode, that measures visible and near-visible radiation. Typical devices have a spectral sensitivity of about 0.4 to 1.1 microns. Alternately, for greater spectral response, the sensor can be a radiation sensitive thermopile, preferably with a differential sensing element to reduce sensitivity of thermal drift. Sensor wires 204 deliver the output of sensor 200 to the controller 9.

The sensor 200 is positioned to receive light from the lower lamps 56–59 that is reflected off of the bottom of cookware placed on cooktop surface 74. The reflectivity of the cookware dictates the amount of light from the lower lamps 56–59 that is reflected by the cookware to sensor 200. The sensor output is a measure of the relative power level of light impinging on it, which is proportionate to the reflectivity of the cookware placed on cooktop 74. The sensor output is also a function of the geometric orientation of the sensor, the oven cavity, and the placement of the cookware therein.

Once the reflectivity of the cookware is measured, the controller 9 changes the time average output of the lower lamps 56–59 accordingly during the cooking cycle based on the measured reflectivity of the cookware in the oven. The controller 9 uses a lookup table and/or an algorithm that relates cookware reflectivity to the desired average output of the lower lamps (as a percentage of full lower lamp output) to compensate for highly reflective or highly absorbing cookware. Then, the number of lamps activated, or the sequentially staggered application of power to the lamps, is changed to raise or lower the output power level of the lower lamps. If, for example, cookware with a high reflectivity is detected, the output power of the lower lamps is increased to bring the cookware to its proper temperature and fully cook the food. Conversely, if cookware with a low reflectivity is detected, the output power of the lower lamps is decreased to prevent the cookware from getting too hot and burning or overcooking the foodstuff. In addition, in order to maximize cooking efficiency for most foods, the upper lamp output power can be increased when the lower lamp power is decreased for cookware reflectivity compensation, and vice versa. The lookup table and/or algorithm is established empirically through experimentation and/or power density calculations based upon the particular lightwave oven design.

Control of the lower lamps depending upon the cookware reflectivity is important for several reasons. First, the bottom surface of the cookware usually has the most contact with the foodstuff and therefore the temperature thereof greatly affects the cooking of the foodstuff through conduction of heat. Secondly, the bottom surface of the cookware has the closest proximity to the lightwave oven lamps, and tends to absorb a lot of energy from these lamps.

In order to accurately measure the cookware's reflectivity, the sensor of the preferred embodiment preferably only detects light incident thereon within a small cone angle (acceptance angle), and is positioned off-center relative to the center of the reflecting surface 50. The sensor 200 is positioned so that its small acceptance angle is oriented at or near the center of cooktop 74. Also, the sensor acceptance angle should be oriented so that as much of the light rays as possible that are incident within the acceptance angle are first reflection light rays, which are rays that originate from the lower lamps and are reflected only once off of the bottom surface portion of the cookware (near the center of the cooktop surface 74) and to the sensor 200. This preferred orientation provides the best and most consistent measurement of cookware reflectivity for the following reasons. First, the center of the cooktop surface 74 is the place most likely to be covered by cookware placed in the lightwave oven. Second, limiting the acceptance angle at or near the center of the cooktop means that the size of the cookware shouldn't significantly affect the reflection measurement. Third, the small acceptance angle minimizes the effects of cookware height, food size and color, and cookware position on the reflection measurement. Fourth, the sensor is using the actual lightwave energy generated by the lamps during the cooking/baking sequence to measure the cookware reflectivity. Thus, it accurately measures reflectivity in real time from the lightwave energy actually used to cook the foodstuff, and any changes in reflectivity can be automatically detected and compensated for during the cooking/baking sequence.

Forming an optimal acceptance angle for sensor 200 can be accomplished in several ways. One way is using a sensor that has internal apertures to result in a small acceptance angle. Another way is to use hole 202 itself as an aperture, and back the sensor 200 from hole 202 to achieve a small acceptance angle. Still another way is to use an optical fiber with an input end thereof at hole 202. The optical fiber has a small acceptance angle, and use of an optical fiber also allows the sensor to placed away from the reflector assembly where the heat emanated therefrom may cause erroneous readings (i.e. especially in thermopile sensors that can be sensitive to ambient heat). It should be noted that there is an optical range of acceptance angle values for sensor 200 to minimize errors in reflectivity determination. The acceptance angle needs to be large enough so that contaminated spots on the cooktop 74 or cookware do not significantly change the amount of light measured by sensor 200, but small enough to prevent significant amounts of second reflected light rays or rays that have not reflected off of the cookware from being detected by sensor 200.

FIG. 3D illustrates the arrangement of the preferred embodiment for mounting sensor 200 under hole 202. Hole 202 is positioned along one of the ridges 206 of lower reflector assembly 24. The sensor 200 is mounted inside a mounting tube 208, with a diffuser 210 immediately above the sensor 200, and an aperture member 212 above the diffuser 210. The diffuser 210 ensures that the sensor is evenly illuminated by the incoming light. The aperture 212, along with the open end 214 of tube 208 act to define the acceptance angle for the sensor 200. Depending upon the optical orientation of mounting tube 208 and sensor 200, either or both the diffuser and aperture could be eliminated.

There are two preferred orientations for tube 208. In the first, the tube is aligned parallel to the ridge 206 in which it sits, and at about 45 degrees to the vertical. Since there is no lamp directly opposing this position on the opposing side of lower reflector assembly 24, the aperture 212 and tube opening 214 should be such that first reflected light (off of the cookware near the center of cooktop 74) from both opposing lamps 58 and 59 can be measured by sensor 200. This configuration is beneficial because the sensor is measuring light from two different lamps that reflect off of two different spots of the cookware, thus measurement errors caused by abnormalities or dirt on the cooktop or cookware, or lamp degradation by one of the lamps, are reduced. Further, if opposite lamps 58 and 59 are sequentially operated at different times, the separate measurements can be averaged together to determined cookware reflectivity.

Alternately, the tube 208 can be oriented not to be parallel to the ridge 206 in which it sits, and the acceptance angle reduced, so that only first reflected light from one of the lamps 58/59 is measured by sensor 200. The reduced narrowness of the acceptance angle reduces the number of light rays that are not first reflections off of the cookware or not from the lower lamps.

For increased accuracy, the sensor 200 should have a peak spectral sensitivity near the peak spectral output of the lamps, which is about 1 micron. Therefore, if the sensor has a wide spectral sensitivity, and/or a peak spectral sensitivity significantly different from the peak spectral output of the lamps, a filter 216 can be added to change the overall spectral sensitivity of the sensor/filter combination to better match that of the lamps.

Glass cookware does not reflect light well like opaque cookware does, so measuring energy absorption by glass cookware is not best performed by trying to measure reflected light from the lower lamps. Instead, glass cookware absorption can be measured by measuring light transmission from the upper lamps. For glass cookware compensation, the sensor acceptance angle is aligned with one of the upper lamps (through the center of cooktop surface 74). The sensor can then be used in several ways to compensate for the use of glass cookware. One way is for the user to calibrate the lightwave oven by placing the glass cookware in the oven without any food thereon. The oven controller then operates the one opposing upper lamp and measures how much light is transmitted through the glass cookware and to the sensor. This level of transmitted light is then compared to the amount of light that reaches the sensor without any cookware or food therein. The difference indicates how much energy is being absorbed by the glass cookware. The controller then controls the lower (and/or upper) lamps accordingly once food on the glass cookware is placed in the oven and the cooking sequence begins.

Alternately, glass cookware compensation can utilize that fact that almost all foodstuffs allow at least some light to pass therethrough. Therefore, if sensor 200 detects that any light from the upper lamps is being transmitted through the food, then that indicates that either a glass pan or no pan is being used. Alternately, if no light from the upper lamps is transmitted through the food, then that indicates that an opaque metal pan is being used. The controller then operates the lamps accordingly.

Cookware significantly larger than the foodstuff placed thereon may also warrant special cooking sequence modifications. With relatively small foodstuffs, the upper lamps significantly contribute to cookware heating. The solution is a special cook mode where the user inputs to the controller that the cookware is significantly larger than the food. Then, the controller can control both the upper and lower lamps appropriately based on the bottom surface reflectivity measured by sensor 200 and the fact that the cookware is much larger than the foodstuff.

It should be noted that if glass cookware, or no cookware, is used to support the foodstuff, then sensor 200 measures the reflectivity of the foodstuff itself when the lower lamps are operated. If sensor 200 detects low food reflectivity, lower lamp powers are reduced to prevent the bottom of the foodstuff from burning. If sensor 200 detects high food reflectivity, then lower lamp powers are increased to properly cook the bottom surface of the foodstuff.

A second reflector assembly embodiment 122 is illustrated in FIGS. 6 and 7A–7C that can be used instead of upper/lower reflector assembly designs 22/24 described above in conjunction with sensor 200 for cookware reflectivity compensation. Reflector assembly 122 includes a circular, non-planar reflecting surface 130 facing the oven cavity 8, a center electrode 132disposed underneath the center of the reflecting surface 130, four outer electrodes 134 evenly disposed at the perimeter of the reflecting surface 130, and four lamps 136, 137, 138, 139 each radially extending from the center electrode 132 to one of the outer electrodes 134 and positioned at 90 degrees to the two adjacent lamps. The reflecting surface 30 includes reflector cups 160, 161, 162 and 163 each oriented at a 90 degree angle to the adjacent reflector cup. The lamps 136–39 are shown disposed inside of cups 160–163, but could also be disposed directly over cups 160–163. The lamps enter and exit each cup through access holes 126 and 128. The cups 160–163 each have a bottom reflecting wall 142 and a pair of shaped opposing sidewalls 144 best illustrated in FIGS. 7A and 7B. (Note that for bottom reflecting wall 142, "bottom" relates to its relative position with respect to cups 160–163 in their abstract, even though when installed facing downward wall 142 is above sidewalls 144). Each sidewall 144 includes 3 planar segments 146, 148 and 150 that generally slope away from the opposing sidewall 144 as they extend away from the bottom wall 142. Therefore, there are seven reflecting surfaces that form each reflector cup 160–16: three from each of the two sidewalls 144 and the bottom reflecting wall 142.

The formation and orientation of the planar segments 146/148/150 is defined by the following parameters: the length L of each segment measured at the bottom wall 142, the angle of inclination θ of each segment relative to the bottom wall 142, the angular orientation Φ between adjacent segments, and the total vertical depth V of the segments. These parameters are selected to maximize efficiency and the evenness of illumination in the oven cavity 8. Each reflection off of reflecting surface 130 induces a 5% loss. Therefore, the planar segment parameters listed above are selected to maximize the number of light rays that are reflected by reflector assembly 122 1) one time only, 2) in a direction substantially perpendicular to the plane of the reflector assembly 122, and 3) in a manner that very evenly illuminates the oven cavity 8.

Figure 8:
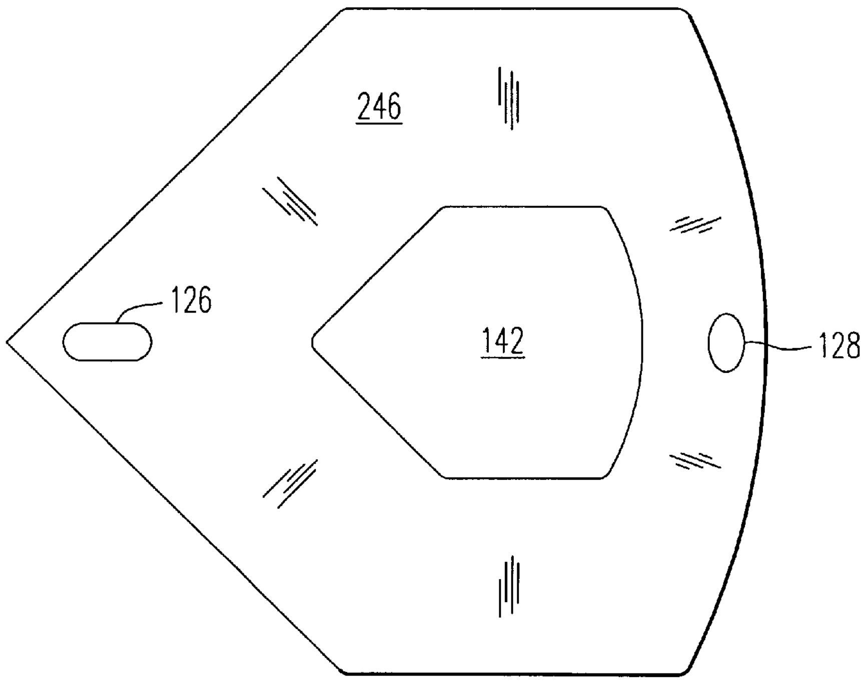
FIG. 8 is a top view of an alternate embodiment of the reflector cup of FIG. 7A.

While reflector assembly 122 is shown with three planar segments 146/148/150 for each side wall 144, greater or few segments can be used to form the reflecting cups 160–163 having a similar shape to the reflecting cups described above. In fact, a single non-planar shaped side wall 246 can be made that has a similar shape to the 6 segments that form the two sidewalls 144 of FIGS. 7A–7C, as illustrated in FIG. 8.

A pair of identical reflector assemblies 122 as described above have been made such that when installed to replace upper and lower reflector assemblies 22/24 above and below the oven cavity 8, excellent efficiency and uniform cavity illumination have been achieved. The reflector assembly 122 of the preferred embodiment has the following dimensions. The reflector assembly 122 has a diameter of about 14.7 inches, and includes 4 identically shaped reflector cups 160–163. Lengths $L_1$, $L_2$ and $L_3$ of segments 146, 148 and 150 respectively are about 1.9, 1.6, and 1.8 inches. The angles of inclination $\theta_1$, $\theta_2$, and $\theta_3$ for segments 146, 148 and 150 respectively are about 54°, 42° and 31°. The angular orientation $\Phi_1$ between the two segments 146 is about 148°, $\Phi_2$ between the two segments 150 is about 90°, $\Phi_3$ between segments 146 and 148 is about 106°, $\Phi_4$ between segments 148 and 150 is about 135°. The total vertical depth V of the sidewalls 144 is about 1.75 inches.

For cookware reflection compensation with reflector assembly 122, sensor 200 is mounted below the lower reflector assembly 122 and aligned with hole 202 formed along one of the ridges 145 in the same manner as described relative to FIG. 3D for the previous reflector embodiment.

Figure 9A:
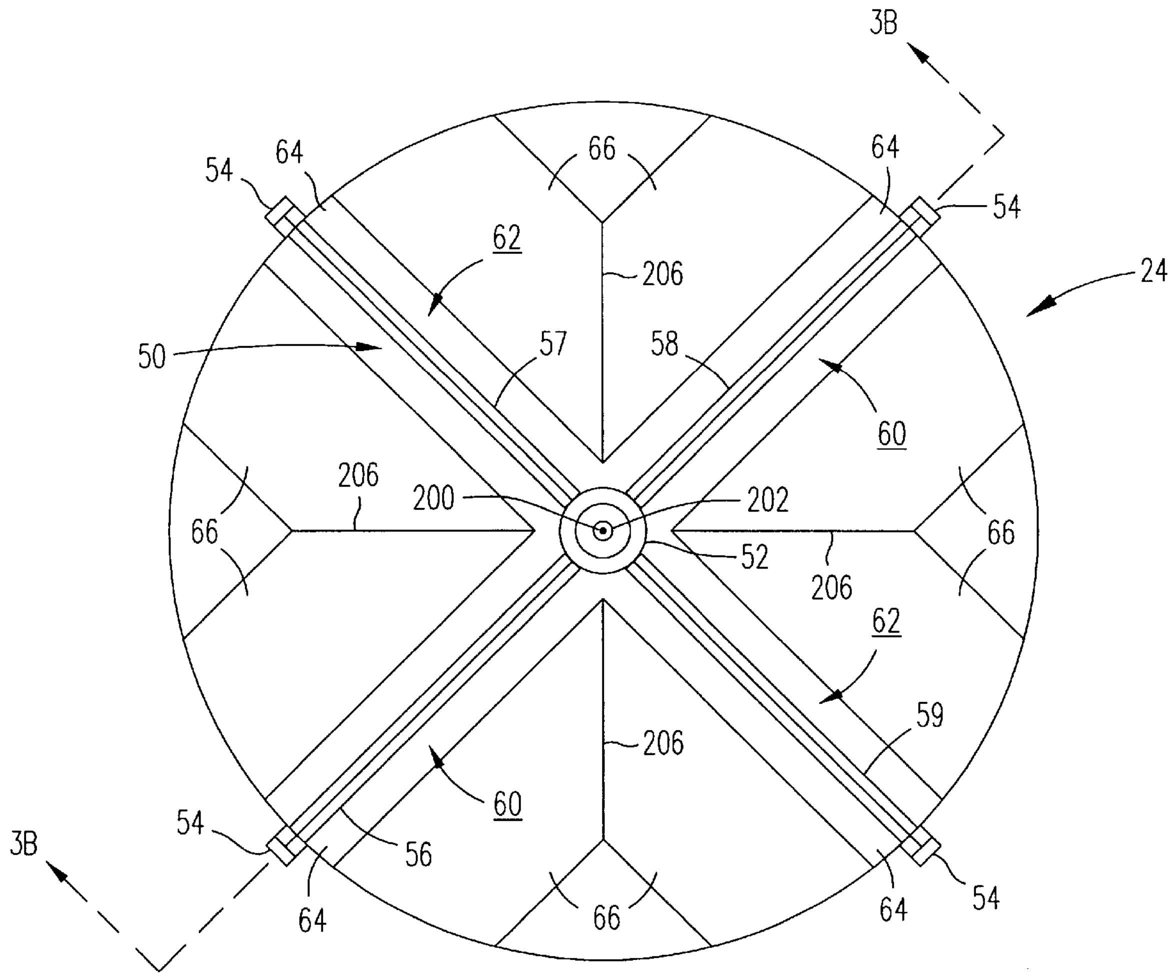
FIGS. 9A and 9B are top views of the lower reflector assemblies illustrating an alternate position of the cookware reflection compensation sensor of the present invention.
Figure 9B:
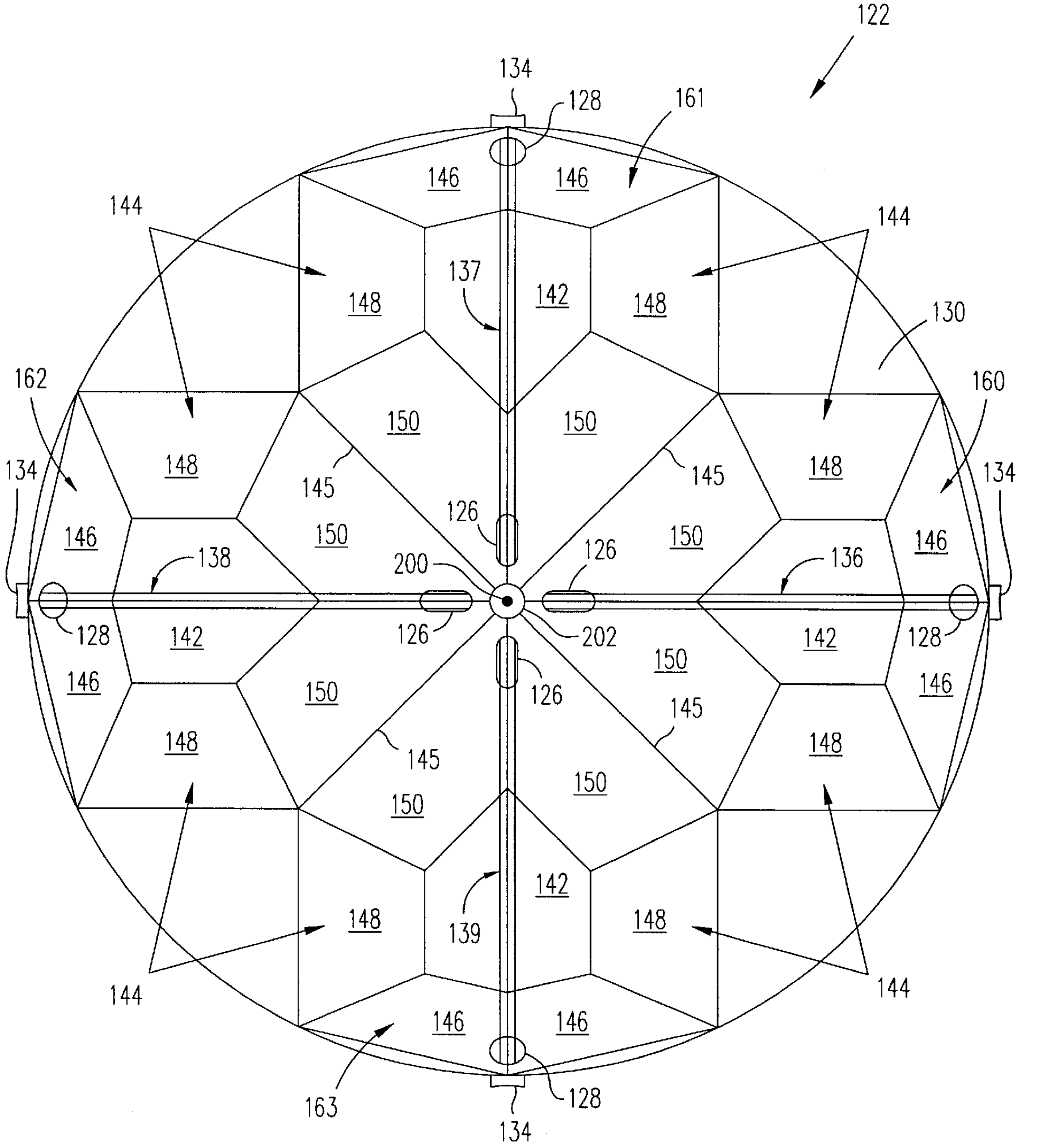

FIGS. 9A and 9B illustrate an alternate position of the optical sensor 200 and hole 202, which are shown located at the center of the lower reflective surface 30 or 130. In the above described embodiments of FIGS. 3A and 6, the non-centrally disposed sensor 200 measures significant amounts of both scatter reflected light and specular reflected light off of the cookware, as well as a significant amount of specular reflected light off of the lower shield 74. The measurement of cookware reflectivity can be enhanced by placing the sensor 200 in the center of the lower reflector and limiting its acceptance angle to reduce and/or minimize specular reflections measured by the sensor for several reasons. First, the ratio of scatter reflected light for absorptive and reflective cookware is much greater than that for specular reflected light. Secondly, placing the sensor 200 in the center of the reflector minimizes measured specular reflections off of the lower shield 74. Finally, the center position of the lower reflector tends to be cooler relative to ridges 206/145, which reduces thermal effects on the sensor 200.

The oven of the present invention may also be used cooperatively with other cooking sources. For example, the oven of the present invention may include a microwave radiation source 170. Such an oven would be ideal for cooking a thick highly absorbing food item such as roast beef. The microwave radiation would be used to help cook the interior portions of the meat and the infra-red, near-visible and visible light radiation of the present invention would cook and brown the outer portions.

It is to be understood that the present invention is not limited to the embodiments described above and illustrated herein, but encompasses any and all variations falling within the scope of the appended claims. For example, the cookware reflectivity compensation sensor can be placed in any lightwave oven cavity configuration.

What is claimed is:

1. A method of cooking food contained in cookware placed in a cooking region of a lightwave oven having an upper plurality of high power lamps positioned above the cooking region and a lower plurality of high power lamps positioned below the cooking region providing radiant energy in the electromagnetic spectrum including the infrared, near-visible and visible ranges, comprising the steps of:

operating at least one of the lower plurality of lamps at an average power level;

measuring an amount of the radiant energy produced by the at least one lower plurality lamp that is reflected by cookware in the cooking region; and changing the average power level of the at least one lower plurality lamp based upon the measured amount of radiant energy.

2. The method of claim 1, wherein the operating step includes sequentially operating the lower plurality of lamps at an average power level by applying power thereto in a staggered manner so that not all of the lamps of the lower plurality of lamps are on at the same time.

3. The method of claim 2, wherein the changing step includes varying the stagger of the sequential operation of the lower plurality of lamps to change the average power level thereof based upon the measured amount of radiant energy.

4. The method of claim 1, wherein the changing step includes:

increasing the average power level of the at least one lower plurality lamp as the measured amount of radiant energy increases, and decreasing the average power level of the at least one lower plurality lamp as the measured amount of radiant energy decreases.

5. The method of claim 4, further comprising the steps of:

operating at least one of the upper plurality of lamps at an average power level;

increasing the average power level of the at least one upper plurality lamp as the average power level of the at least one lower plurality lamp is decreased; and decreasing the average power level of the at least one upper plurality lamp as the average power level of the at least one lower plurality lamp is increased.

6. The method of claim 1, further comprising the steps of:

operating at least one of the upper plurality of lamps at an average power level;

measuring an amount of the radiant energy produced by the at least one upper plurality lamp that is transmitted through cookware in the cooking region; and changing the average power level of the at least one upper plurality lamp based upon the measured amount of radiant energy transmitted through the cookware.

7. A lightwave oven for cooking food contained in cookware, comprising:

an oven cavity housing enclosing a cooking region therein;

an upper plurality and a lower plurality of high power lamps that provide radiant energy in the visible, near-visible and infrared ranges of the electromagnetic spectrum, wherein the upper plurality of lamps are positioned above the cooking region and the lower plurality of lamps are positioned below the cooking region;

an optical sensor for measuring an amount of the radiant energy produced by at least one of the lower plurality of lamps that is reflected by cookware in the cooking region;

a controller that operates the at least one lower plurality lamp at an average power level that varies depending upon the amount of radiant energy measured by the optical sensor.

8. The lightwave oven of claim 7, wherein:

the controller sequentially operates the lower plurality of lamps at an average power level by applying power thereto in a staggered manner so that not all of the lower plurality of lamps are on at the same time; and the controller varies the stagger of the sequential operation of the lower plurality of lamps to change the average power level of the at least one lower plurality lamp based upon the measured amount of radiant energy by the optical sensor.

9. The lightwave oven of claim 8, wherein the controller changes an average power level of the upper plurality of lamps based upon the amount of radiant energy measured by the optical sensor.

10. The lightwave oven of claim 9, wherein:

the controller reduces the average power level of the lower plurality of lamps as the measured amount of radiant energy by the sensor decreases, and the controller increases the average power level of the lower plurality of lamps as the measured amount of radiant energy by the sensor increases.

11. The lightwave oven of claim 10, wherein:

the controller reduces the average power level of the upper plurality of lamps as the measured amount of radiant energy by the sensor increases, and the controller increases the average power level of the upper plurality of lamps as the measured amount of radiant energy by the sensor decreases.

12. The lightwave oven of claim 7, wherein:

the optical sensor measures an amount of the radiant energy produced by at least one of the upper plurality of lamps that is transmitted through cookware in the cooking region;

the controller operates the at least one upper plurality lamp at an average power level that varies depending upon amount of radiant energy measured by the optical sensor that is transmitted through the cookware.

13. A method of cooking food contained in cookware placed in a cooking region of a lightwave oven having an upper plurality of high power lamps positioned above the cooking region and a lower plurality of high power lamps positioned below the cooking region providing radiant energy in the electromagnetic spectrum including the infrared, near-visible and visible ranges, comprising the steps of:

operating the lower plurality of lamps at an average power level;

measuring an amount of the radiant energy produced by the lower plurality of lamps that is reflected by cookware in the cooking region; and changing the average power level of the lower plurality of lamps based upon the measured amount of radiant energy.

14. The method of claim 13, wherein the operating step includes sequentially operating the lower plurality of lamps at an average power level by applying power thereto in a staggered manner so that not all of the lamps of the lower plurality of lamps are on at the same time.

15. The method of claim 14, wherein the changing step includes varying the stagger of the sequential operation of the lower plurality of lamps to change the average power level thereof.

16. The method of claim 13, wherein the changing step includes:

increasing the average power level of the lower plurality of lamps as the measured amount of radiant energy increases, and decreasing the average power level of the lower plurality of lamps as the measured amount of radiant energy decreases.

17. The method of claim 16, further comprising the steps of:

operating the upper plurality of lamps at an average power level;

increasing the average power level of the upper plurality of lamps as the average power level of the lower plurality of lamps is decreased; and decreasing the average power level of the upper plurality of lamps as the average power level of the lower plurality of lamps is increased.

18. The method of claim 13, further comprising the steps of:

operating the upper plurality of lamps at an average power level;

measuring an amount of the radiant energy produced by the upper plurality of lamps that is transmitted through cookware in the cooking region; and changing the average power level of the upper plurality of lamps based upon the measured amount of radiant energy transmitted through the cookware.

19. A lightwave oven for cooking food contained in cookware, comprising:

an oven cavity housing enclosing a cooking region therein;

an upper plurality and a lower plurality of high power lamps that provide radiant energy in the visible, near-visible and infrared ranges of the electromagnetic spectrum, wherein the upper plurality of lamps are positioned above the cooking region and the lower plurality of lamps are positioned below the cooking region;

an optical sensor for measuring an amount of the radiant energy produced by the lower plurality of lamps that is reflected by cookware in the cooking region;

a controller that operates the lower plurality of lamps at an average power level that varies depending upon the amount of radiant energy measured by the optical sensor.

20. The lightwave oven of claim 19, wherein:

the controller sequentially operates the lower plurality of lamps at an average power level by applying power thereto in a staggered manner so that not all of the lower plurality of lamps are on at the same time; and the controller varies the stagger of the sequential operation of the lower plurality of lamps to change the average power level thereof based upon the measured amount of radiant energy by the optical sensor.

21. The lightwave oven of claim 20, wherein the controller changes an average power level of the upper plurality of lamps based upon the amount of radiant energy measured by the optical sensor.

22. The lightwave oven of claim 21, wherein:

the controller reduces the average power level of the lower plurality of lamps as the measured amount of radiant energy by the sensor decreases, and the controller increases the average power level of the lower plurality of lamps as the measured amount of radiant energy by the sensor increases.

23. The lightwave oven of claim 22, wherein:

the controller reduces the average power level of the upper plurality of lamps as the measured amount of radiant energy by the sensor increases, and the controller increases the average power level of the upper plurality of lamps as the measured amount of radiant energy by the sensor decreases.

24. The lightwave oven of claim 19, wherein:

the optical sensor measures an amount of the radiant energy produced by the upper plurality of lamps that is transmitted through cookware in the cooking region;

the controller operates the upper plurality of lamps at an average power level that varies depending on the amount of radiant energy measured by the optical sensor that is transmitted through the cookware.

* * * * *